(12) United States Patent
Trevino et al.

(10) Patent No.: US 8,246,518 B2
(45) Date of Patent: Aug. 21, 2012

(54) SHIFTING SYSTEM FOR A VEHICLE TRANSMISSION

(75) Inventors: Christopher Charles Trevino, Temecula, CA (US); Gerhard Heinrich Fiedler, Buena Park, CA (US)

(73) Assignee: American Supercars and Prototypes, Fall Brook, CA (US)

( * ) Notice: Subject to any disclaimer, the term of this patent is extended or adjusted under 35 U.S.C. 154(b) by 798 days.

(21) Appl. No.: 12/383,307

(22) Filed: Mar. 23, 2009

(65) Prior Publication Data

US 2009/0199671 A1    Aug. 13, 2009

Related U.S. Application Data

(63) Continuation-in-part of application No. 11/454,503, filed on Jun. 16, 2006, now abandoned.

(51) Int. Cl.
*F16H 61/16* (2006.01)
*F16H 61/18* (2006.01)

(52) U.S. Cl. .................. 477/125; 74/473.12; 74/473.31; 74/473.21; 701/62

(58) Field of Classification Search ............... 74/473.12, 74/473.14, 473.3, 473.31, 473.21; 477/115, 477/122, 125, 126; 701/52, 62
See application file for complete search history.

(56) References Cited

U.S. PATENT DOCUMENTS

| | | | | |
|---|---|---|---|---|
| 2,634,622 | A * | 4/1953 | Cripe ............................... | 74/335 |
| 5,471,893 | A * | 12/1995 | Newbigging .................... | 74/335 |
| 5,828,974 | A * | 10/1998 | Hawarden et al. .............. | 701/64 |
| 6,470,764 | B1 * | 10/2002 | Yamaguchi et al. ............ | 74/335 |
| 6,474,186 | B1 * | 11/2002 | Vollmar ......................... | 74/335 |
| 6,691,816 | B2 * | 2/2004 | Houston ........................ | 180/336 |
| 7,137,499 | B2 * | 11/2006 | Riefe et al. ................. | 192/220.2 |
| 2002/0123669 | A1 | 9/2002 | Wickstrom ..................... | 74/335 |
| 2002/0124669 | A1 * | 9/2002 | Melis .............................. | 74/335 |
| 2006/0278029 | A1 * | 12/2006 | Burgbacher ................... | 74/335 |

* cited by examiner

*Primary Examiner* — Justin Holmes
*Assistant Examiner* — Huan Le
(74) *Attorney, Agent, or Firm* — Louis L. Dachs

(57) ABSTRACT

The invention is a transmission shifting system for a vehicle, the vehicle having a transmission having a push-pull and rotating member for operating the transmission movable in an H pattern. In detail, the invention includes a first reversible electric motor coupled to the member for moving the member backwards and forwards. A second reversible electric motor is coupled to the member for rotating the member clockwise and counter-clockwise. The second motor coupled to the member by means of a biasing assembly such that a biasing force can be applied to the member when the second motor rotates without the member rotating. A transmission shifter control system is provided for sequencing the operation of the first and second motors so to move the member in the H pattern upon receipt of an actuation signal.

18 Claims, 22 Drawing Sheets

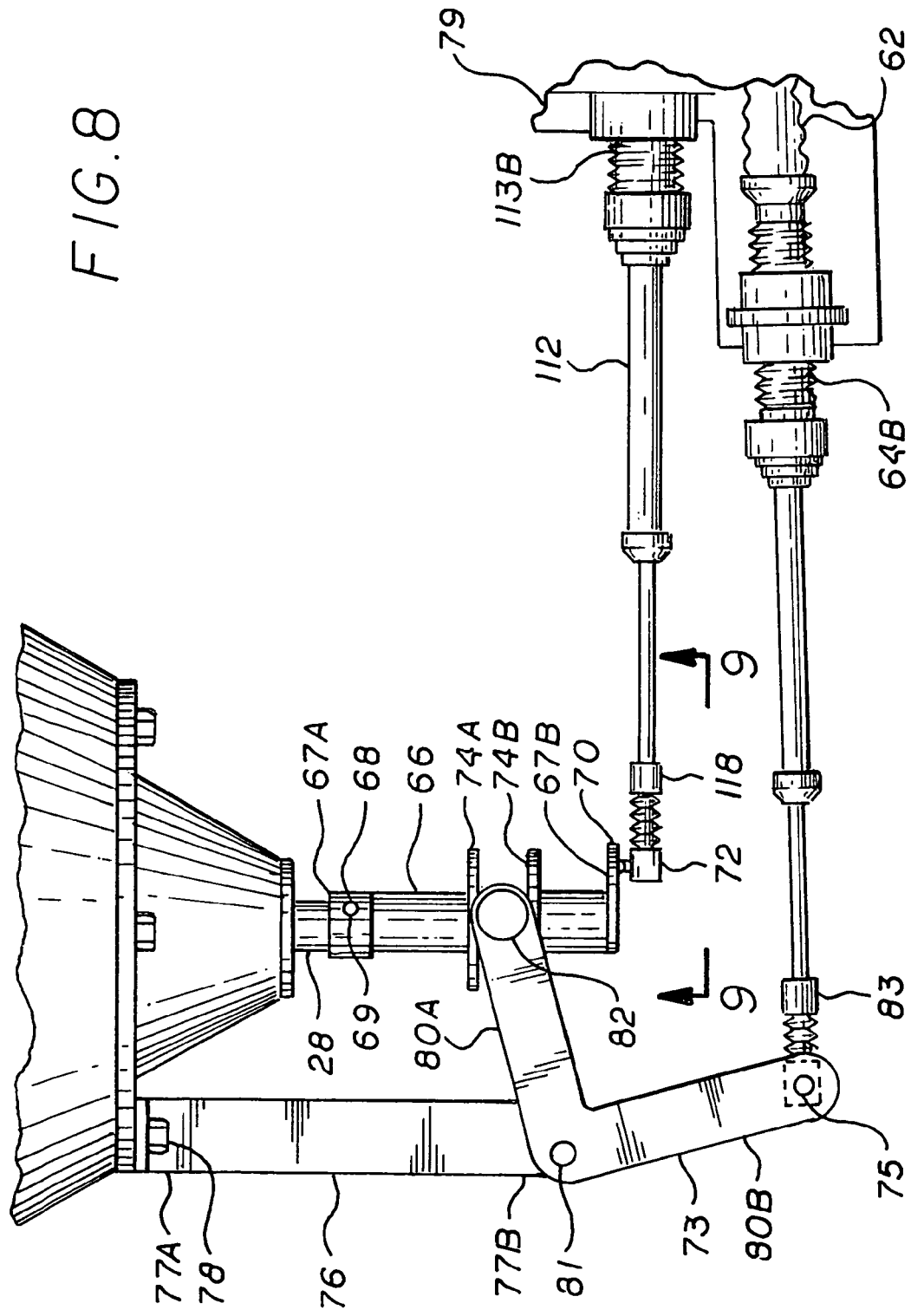

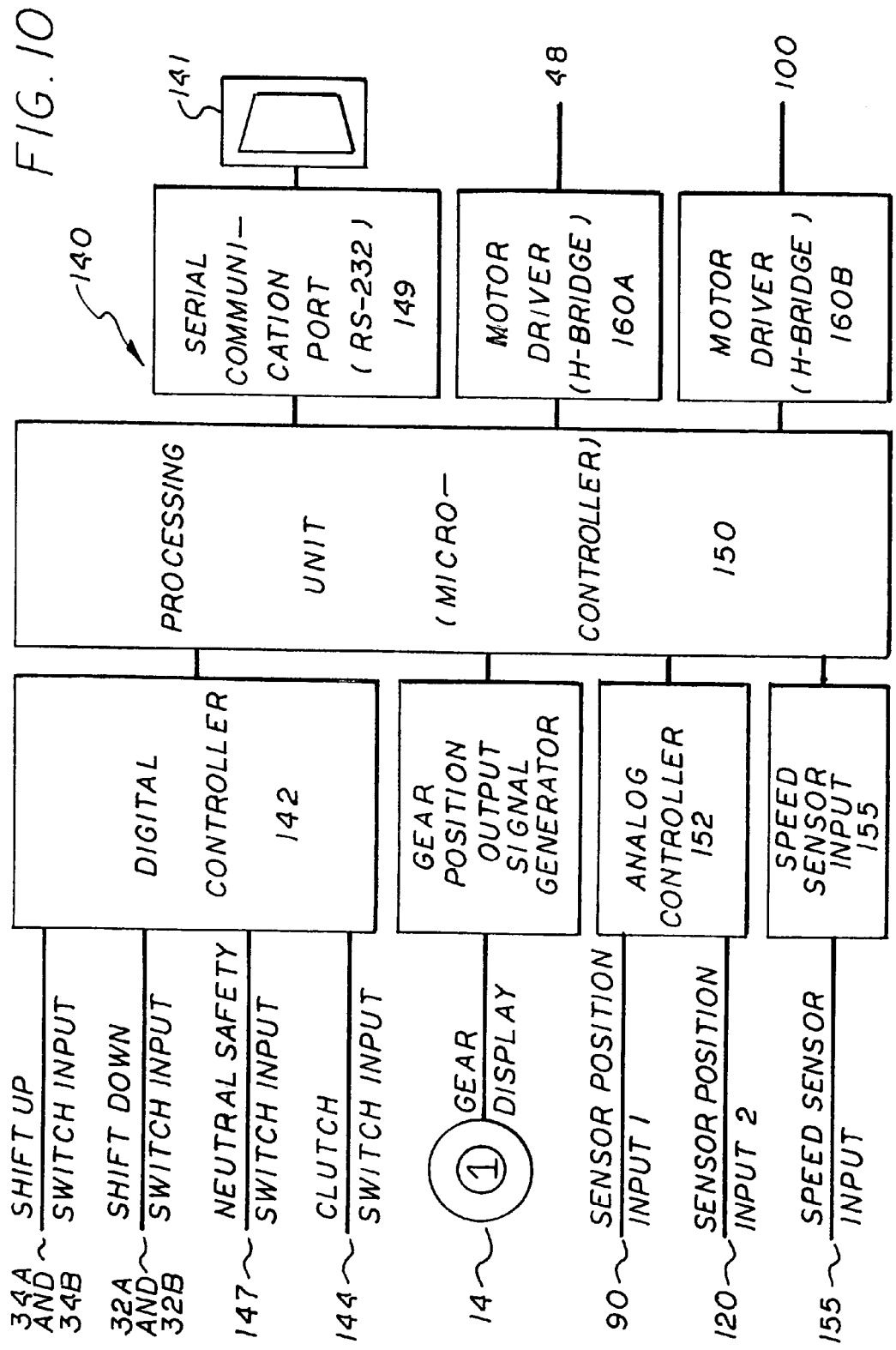

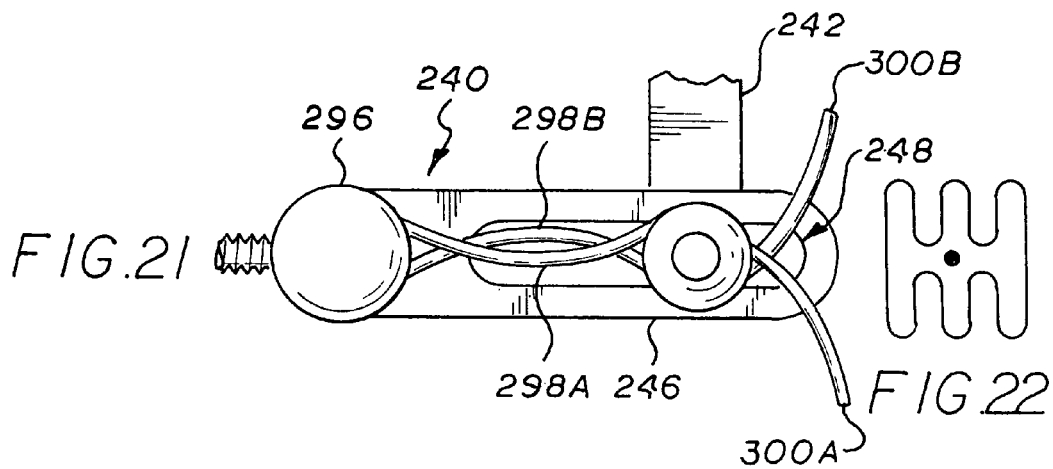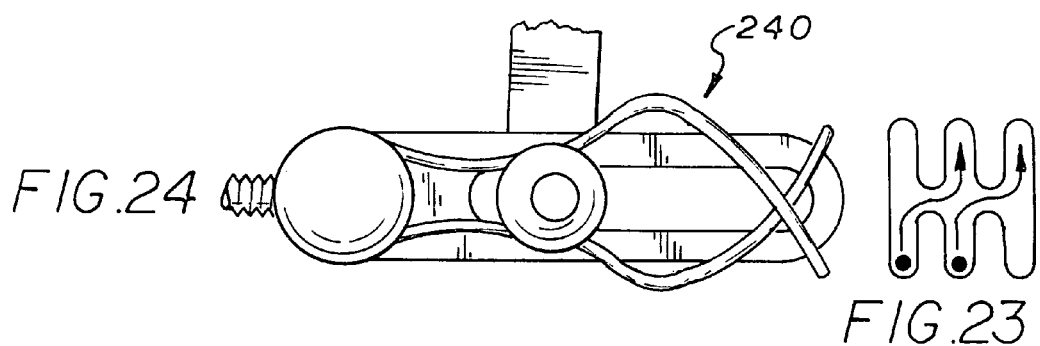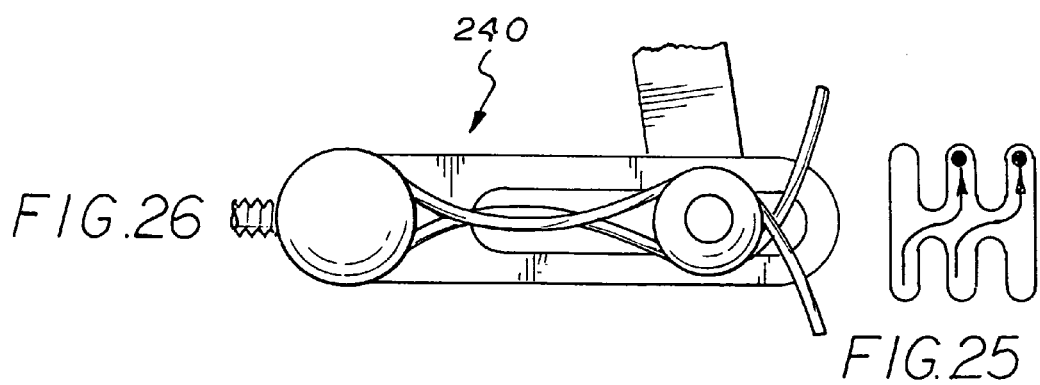

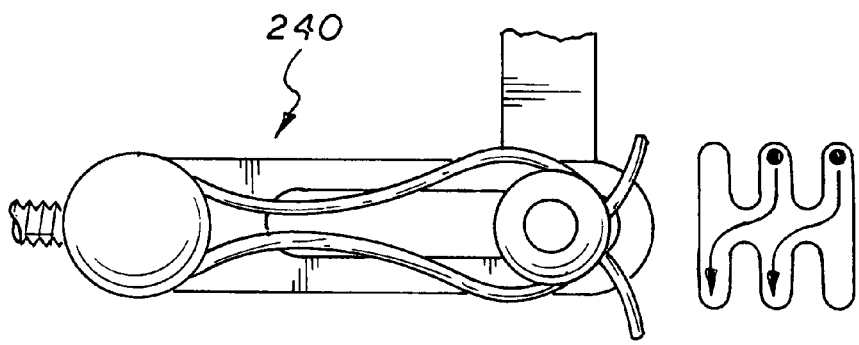
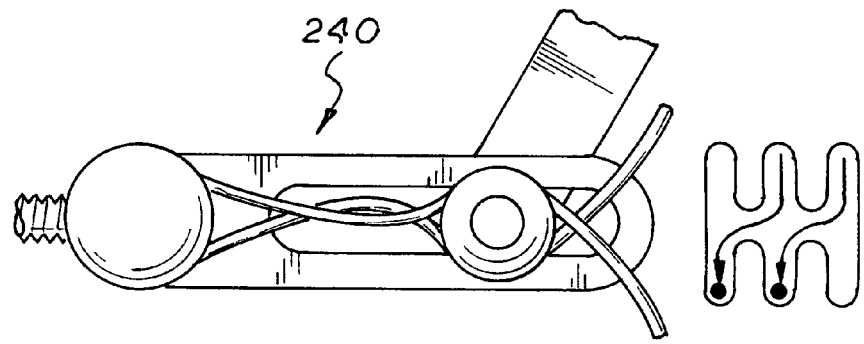

SHIFTING SYSTEM FOR A VEHICLE TRANSMISSION

RELATED APPLICATIONS

This application is a continuation in part of patent application Ser. No. 11/454,503 SHIFTING SYSTEM FOR A VEHICLE TRANSMISSION by Christopher Charles Trevino, et al. filed Jun. 16, 2006 now abandoned

BACKGROUND OF THE INVENTION

1. Field of the Invention

The invention relates to the field of shifting systems for transmissions for automobiles and the like and, in particular, to a shifting system for a transmission having an H pattern actuation system.

2. Description of Related Art

Originally, all transmission shifting was accomplished manually with a stick type shifter positioned on the floor. However, this made three abreast seating in the front seat of the automobile difficult. To provide for three abreast seating in the front seat, column-mounted manual shifting systems became popular. This mounting position remained popular even when automatic transmissions were introduced. However, sport cars and most racing cars still used floor-mounted shifters. Chrysler Corporation in the 1950's time frame introduced a transmission controlled by push-buttons When the sports or sporty cars became popular, the trend reverted back to mounting the shifter on the floor, in reality on top of the transmission. In fact, with the advent of "bucket seats" limiting the front of the passenger compartment to two, center mounting the shifter was a significant cost saver. However, more recent advancements, particularly in Formula One racing cars, have produced automatic shifting manual transmissions. That is a manual type transmission with a clutch that can be automatically shifted by use of electronics and hydraulic or electric actuators. This advancement led to the placement of the shifting mechanism back on to the steering column, where paddles and the like accomplish shifting. Presently, this concept is being introduced into production automobiles. In fact, it is being used in conjunction with automatic transmissions on cars manufactured by Porsche and the Pontiac Division of General Motors. Many other manufactures are expected to follow with such shifting systems.

An alternate approach has been to design manual transmissions such that a floor mounted shift lever, connected by a push-pull cable to the transmission, is only moved forward for upshifts and backward for downshifts, often without the use of the clutch pedal. Thus up-shifting goes from neutral to gears 1, 2, 3, 4, etc.; downshifting goes from gears 4, 3, 2, 1 to neutral. A separate second gear shift lever is used for reverse, which can only activate when the transmission is in neutral. Typically, all that is required to make a shift between forward gears is a slight lifting of the gas pedal while the shift is made. To go into reverse, the first shift lever must be in neutral. These types of transmissions are commercially available, and used primarily in racing cars and off road vehicles. Mendeola Transaxles Incorporated, Chula Vista, Calif., markets a transaxle of this type. It would also be desirable to provide for the conversion of these types of transmissions to make shifting control available on the steering wheel. PBS Engineering, Garden Grove, Calif. makes and uses a paddle shifter system mounted on the steering wheel. Even though the steering wheel mounted paddles activate electrical switches, the system itself is pneumatically powered and requires an air supply system. Other systems use hydraulics, which also require a separate hydraulic system for transmission shifting.

In applicants co-pending patent application Ser. No. 11/329,352 Shifting Method And System For A Vehicle Transmission, filed on Jan. 10, 2006 discloses a system for a vehicle having a transmission with a push-pull member for operating the transmission movable from a first starting position to a second up-shifting or to a third downshift position. Such transmissions are called sequential shifting transmissions. It uses a reversible electric motor, having an output shaft, with the motor capable of rotating the shaft in first and second directions. The output shaft of the motor is coupled to the push-pull member of the transmission such that rotation of the shaft in a first direction moves the push-pull member toward the first position and when the shaft rotates in the second direction to the third position. A transmission shifter control is provided for actuating the motor to move the input member from the first position to the second position and back to the first position upon receipt of a first signal, and to move the push-pull member from the first position to the third position and back to the first position upon receipt of a second signal. A paddle system mounted on the steering wheel of the vehicle provides the first and second signals. However, this invention is not applicable to H pattern shifting transmissions.

Thus, it is a primary object of the invention to provide a transmission shifting system that converts a floor mounted or column mounted shifting system to a steering wheel mounted system.

It is another primary object of the invention to provide a transmission shifting system that converts a floor mounted or column mounted shifting system to a steering wheel mounted system for after-market installation on automobiles.

It is a further object of the invention to provide a transmission shifting system that that is electrically powered and easily installed.

It is a still further object of the invention to provide a transmission shifting system for a transmission that shifts between gears in an H pattern shifting transmission.

SUMMARY OF THE INVENTION

The invention is a transmission shifting system for automobiles. The automobile includes a transmission having a push-pull and rotating member for operating the transmission movable in an H pattern. The system includes a first reversible electric gear motor coupled to the member for moving the member in a back and forth direction. A second reversible electric motor is coupled to the member for rotating both clockwise and counter-clockwise. A control system is provided for the actuation of the first and second electric motors such that the member can be moved in an H pattern.

Preferably, the motors include an anti-backlash gear system between the motors and their output shafts. A first mechanism is provided for coupling the output shaft of the first motor to the member such that rotation of the shaft in the first direction pushes or pulls the push pull and rotating member in one direction and rotation of the first motor in the opposite direction moves the member in a second direction. A second mechanism is provided for coupling the output shaft of the second motor to the push pull member such that rotation of the second motor in a first direction rotates the push pull and rotating member clockwise and rotation of the second motor in the counter clockwise direction cause the push pull and rotating member to rotate counter clockwise.

Preferably, the second mechanism includes a biasing assembly such that a biasing force can be applied to the member when the second motor rotates without the member rotating. This allows the member to be preloaded to rotate, prior to an up shift or downshift such that when the up shift or downshift is initiated, only the first motor need be actuated. Preferably, the second member includes a crank handle with a pin. A shaft having a first end coupled to the second motor and a second end mounting the biasing assembly, with the biasing assembly coupled to the pin. The biasing assembly includes: the second end of the shaft having a slot. A lug is mounted on the shaft inboard of the slot with the pin is movably mounted in the slot. A resilient wire spring having a middle portion wrapped around the lug and the first and second legs crossing each other between the lug and the pin extending about the pin and re-crossing on the opposite side of the pin, biasing the pin in position.

The automobile includes a steering wheel with a gear selection system mounted thereon, which provide a first and second signal to the transmission control system. These first and second signals are interpreted by the transmission control system to either cause an up shift or a downshift of the transmission.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 8 is an enlarged view of a portion of FIG. 5 illustrating the connection of cables from the drive assemblies shown in FIGS. 6 and 7 to the transmission.

FIG. 10 is a functional diagram of the control system for the transmission shifting system.

FIG. 21 is a top view of the device shown in FIG. 19.

FIG. 22 is a diagram of the H pattern shifter positions for the position shown in FIG. 21.

FIG. 23 is a view similar to FIG. 22 illustrating the H pattern shifting from second to third and from fourth to fifth positions.

FIG. 24 is a view similar to FIG. 21 illustrating the device in the position to shift the transmission from second to third and fourth to fifth positions.

FIG. 25 is a view similar to FIG. 23 illustrating the H pattern shifting completed from second to third and fourth to fifth gears.

FIG. 26 is a view similar to FIG. 24 illustrating the device in the position after the shift from second to third and fourth to fifth position.

FIG. 27 is a view similar to FIG. 25 illustrating the H pattern shifting positions going from third to second and fifth to fourth gears.

FIG. 28 is a view similar to FIG. 26 illustrating the device in the position to shift the transmission from third to second and fifth to fourth gears.

FIG. 29 is a view similar to FIG. 27 illustrating the H pattern shifting position after a shift into second or fourth gear.

FIG. 30 is a view similar FIG. 28 illustrating the device in the position after shifting down from third to second and fifth to fourth gears.

DESCRIPTION OF THE PREFERRED EMBODIMENT

Figure 1:
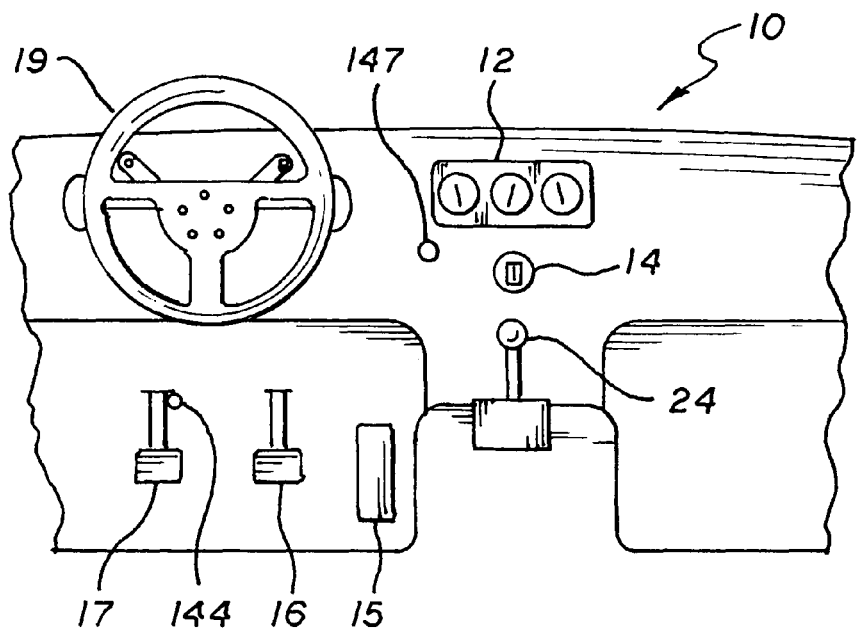
FIG. 1 is a partial view of the interior of an automobile dashboard, steering column and center console with transmission shifter.
Figure 2:
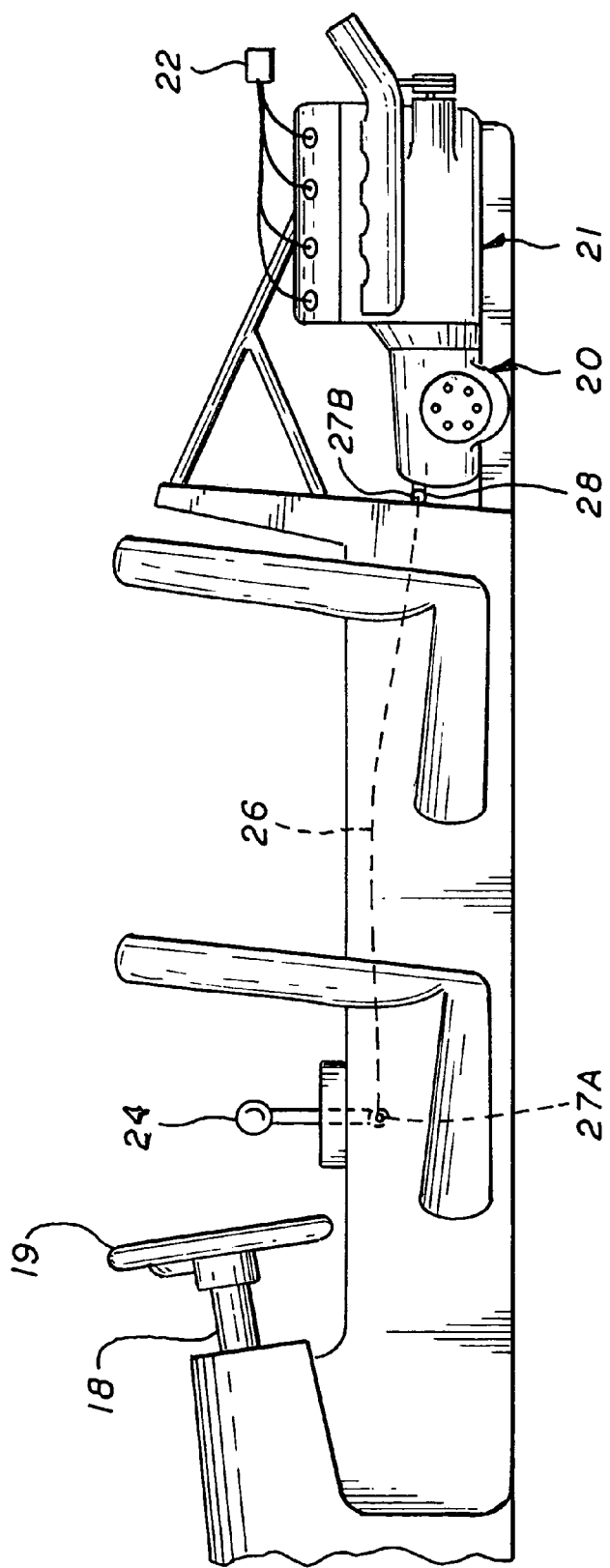
FIG. 2 is side view of a vehicle equipped with the transmission shown in FIG. 1.

Referring to FIGS. 1 and 2, the dashboard 10 includes an instrument panel 12, a transmission gear display 14. Also illustrated are the gas pedal 15, brake pedal 16 and clutch pedal 17. Additionally illustrated are the steering column 18 and steering wheel 19, and transmission 20 coupled to an engine 21 with an engine management system 22.

Figure 3A:
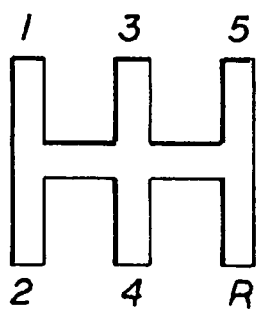
FIG. 3A is a schematic of a typical H pattern 5 speed shifter.
Figure 3B:
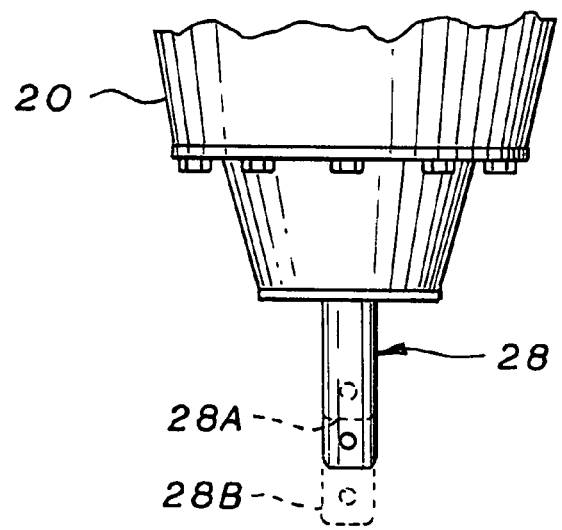
FIG. 3B is a partial view of the transmission illustrating the linear translation of a typical H pattern transmission gear shift operating shaft during shifting.
Figure 3C:
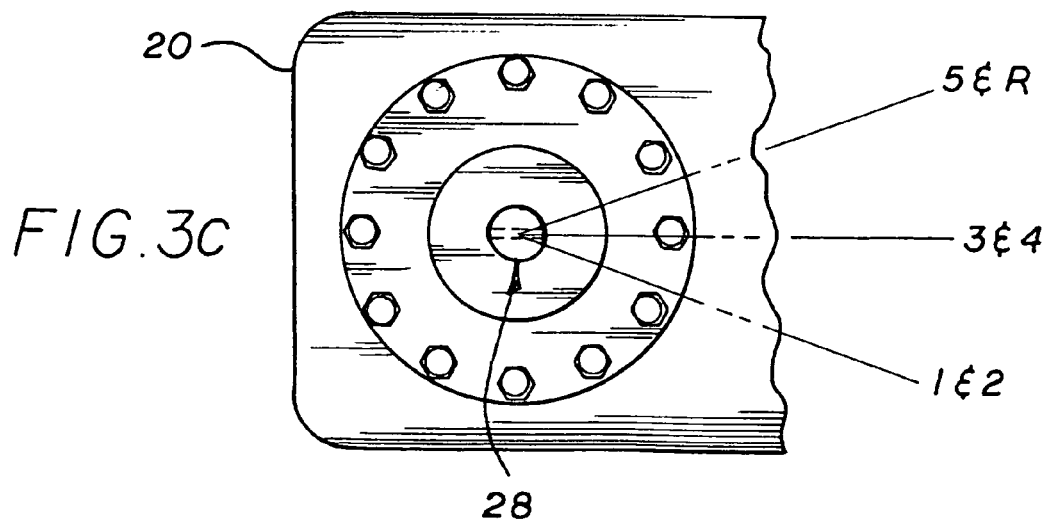
FIG. 3C is a rear view of a typical H pattern transmission illustrating the rotational movement of the transmission gear shift operating shaft during shifting.
Figure 5:
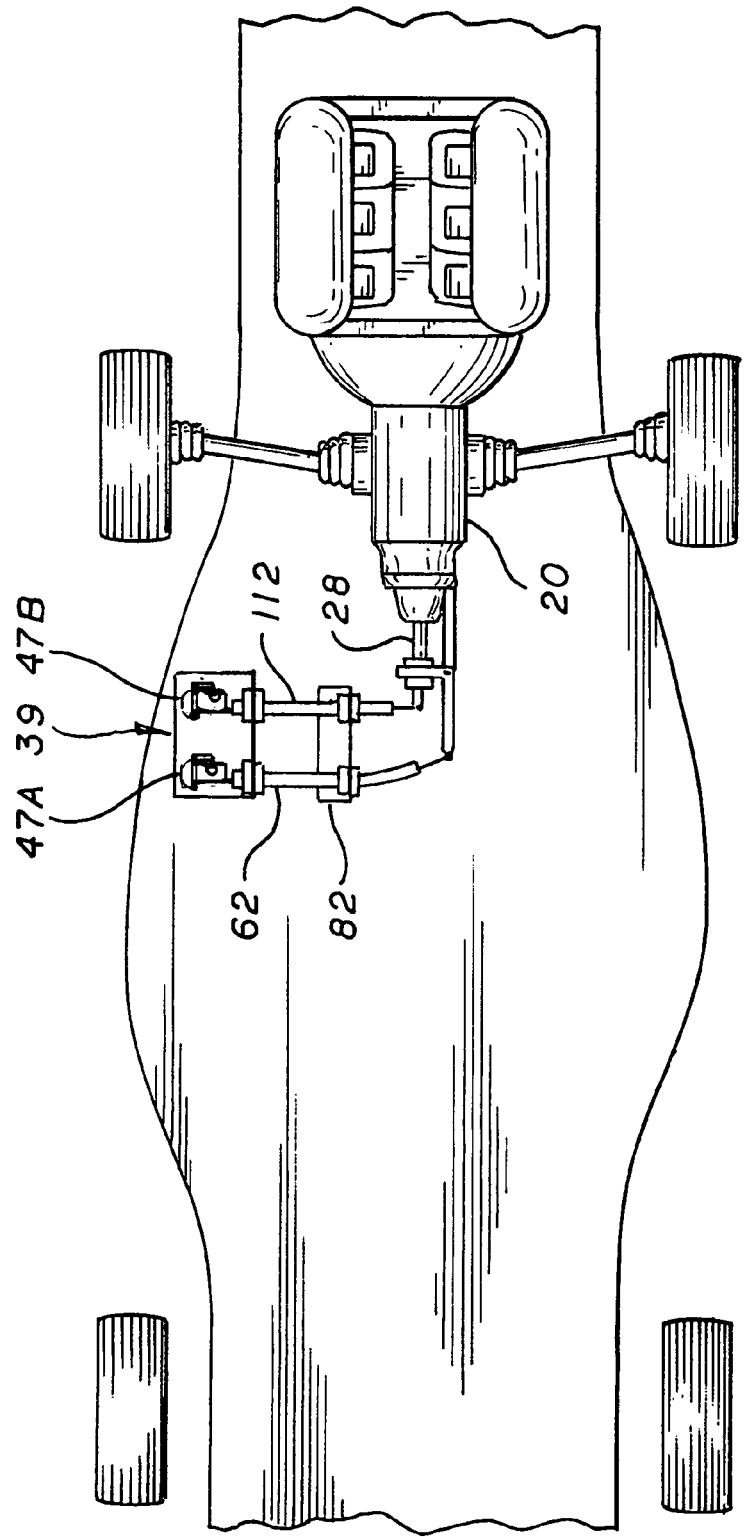
FIG. 5 is plan view of the automobile shown in FIG. 2 illustrating the mounting of the subject shifting system.
Figure 6:
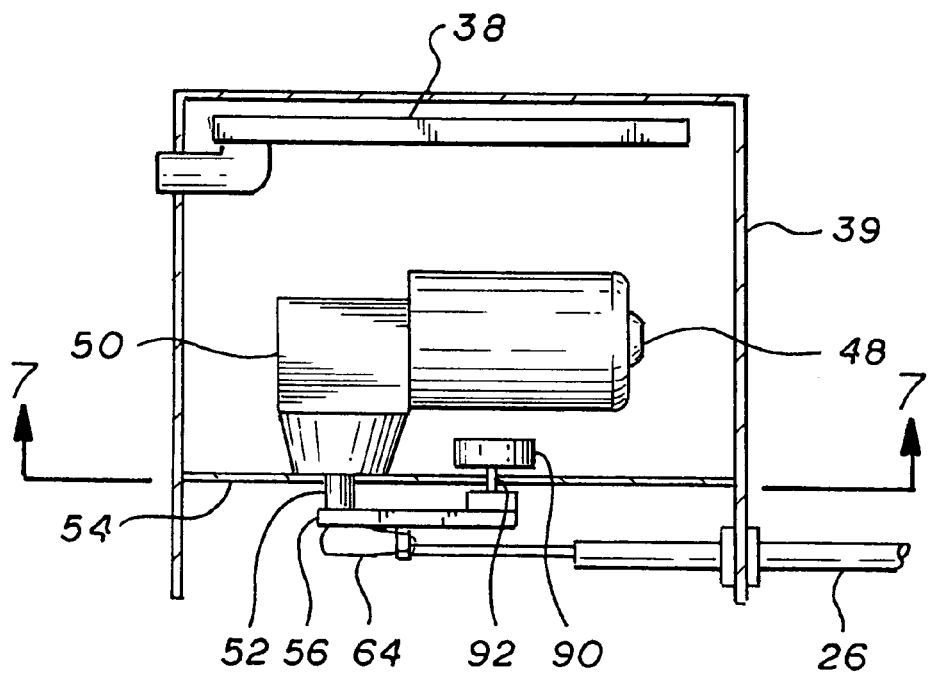
FIG. 6 is a cross-sectional view of the housing containing the drive assemblies used to shift the transmission.
Figure 9:
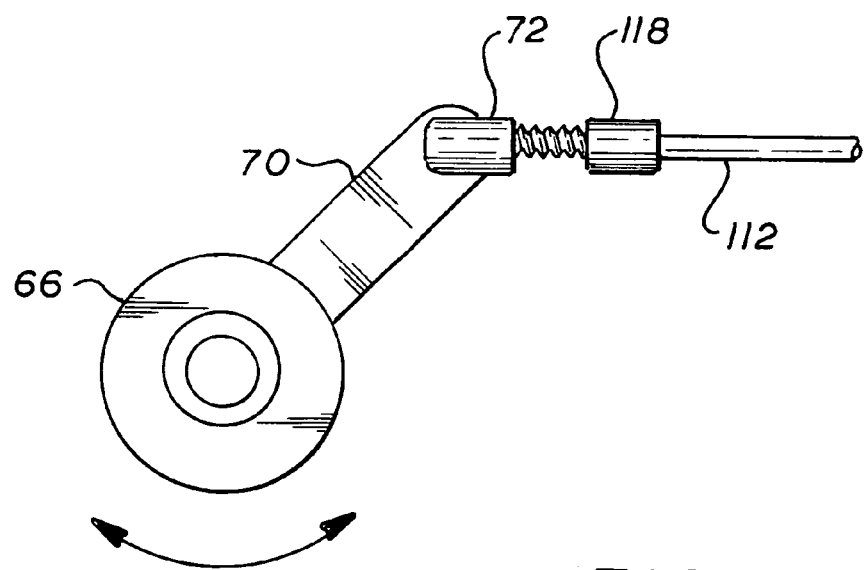
FIG. 9 is partial end view of the transmission shown in FIG. 8 taken along the arrow 9.
Figure 7:
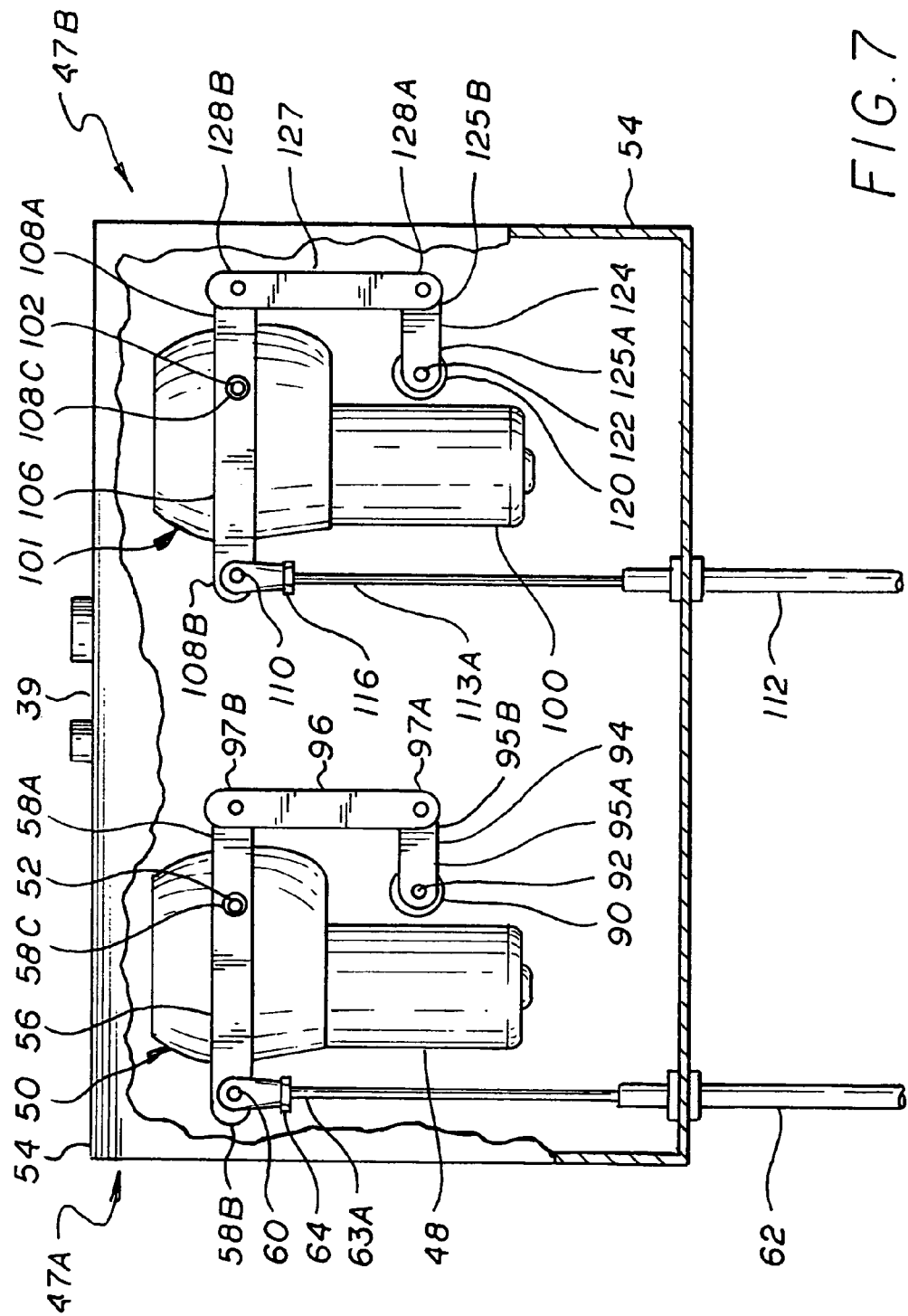
FIG. 7 is a cross-sectional view of FIG. 6 taken along the line 7-7.

Referring to FIG. 1, FIG. 2 and 3A, B, C, the transmission is shifted using a center mounted shift lever 24 that moves in an H Pattern (FIG. 3A) and controls the forward gears, neutral, and reverse. Shift lever 24 is connected by a push-pull and rotational rod 26 to the transmission 20. The rod 26, has a first end 27A connected to the lever 24 and a second end 27B connected to a shifting input shaft 28 on the transmission 20. Such shifting patterns are called H patterns because the early manual transmissions in automobiles had three forward gears and one reverse gear. First gear was up and to the left, second gear was down to the left, third gear was up and to the right, and reverse was down to the right. Of course, various existed. Present day 4 to 6 forward gears and one reverse are common; however, they are still referred to as H patterns, even though it has more than 3 forward speeds and therefore more than four gear positions. The input shaft 28 translates as well as rotates to shift gears. Showing a typical 5 speed transmission, in position 28A it is in either gears $1^{st}$, $3^{rd}$ or $5^{th}$, depending upon its rotational position. In position 28B it is in $2^{nd}$, $4^{th}$ or Reverse, also dependent upon rotational position.

In the subject invention, rod 26 and the lever 24, are removed in their entirety.

Figure 4:
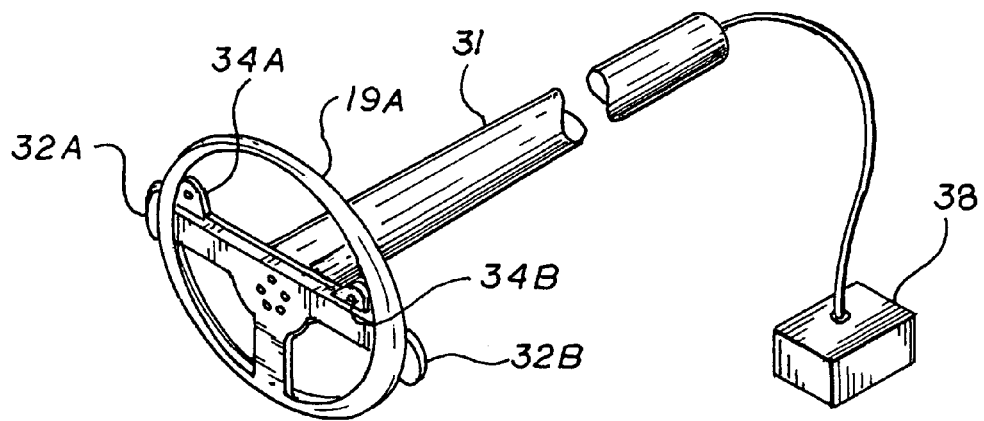
FIG. 4 is perspective view of a steering wheel and column with gear shift actuator switches mounted thereon.

The subject invention eliminates the need for the driver to take his or her hands off of the steering wheel. Referring to FIG. 4, a commercially available steering wheel 19A mounted on steering column 31 having a "paddle wheel switch" or push button system can be used, which replaces the shift lever 24 and steering wheel 19. The wheel shifter 19A is available from American Supercars and Prototypes, LLC. Fallbrook, Calif. The steering wheel includes paddle switches 32A and 32B for up shifting and button type switches 34A and 34B for downshifting. Of course, some models will have only one paddle switch 32A for up shifting and one paddle switch 32B for downshifting. In the model shown in FIG. 4, an electrical signal is sent down the steering column 31 to a controller 38, which controls up shift and downshift requests, the operation of which will be subsequently discussed. Twist Machine, LLC., Hampton, N.Y., also manufactures a paddle type steering wheel which uses an RF signal generator mounted in the steering wheel which can be used to send the signals to the transmission controller 38.

Still referring to FIGS. 1-4 and additionally to FIGS. 5-9, a housing 39 is mounted in proximity to the transmission 20. The housing 39 contains the transmission shifting controller 38 and includes two drive assemblies 47A, which is used to translate the shaft 28, and 47B, which is use to rotate the shaft 28.

Drive assembly 47A includes an electric motor 48 having an anti-back lash gear reduction unit 50 coupled to an output shaft 52 that extends out of a side wall 54 of the housing 39. A suitable combination electric motor and anti-backlash gear assembly is Part No.: 9390453042, manufactured by Robert Bosch Limitada, Campinas, Brazil. A lever 56 having first and second ends, 58A and 58B, respectively, and a middle hole 58C is mounted to the shaft 52 by its middle hole 58C. The second end 58B includes a ball fitting 60. A cable 62 includes a first end 63A that includes a quick disconnect fitting 64 adapted to mate with ball fitting 60. The cable is preferably Part Number 175403-001XQ, manufactured by Control Cables, Incorporated, Santa Fe Springs, Calif. Thus the ball fitting 60 is in releasable engagement with the quick disconnect fitting 64.

A hollow fitting 66 having first and second ends 67A and 67B is coupled by its first end to the shaft 28 and attached thereto by fastener assembly 68 extending through a hole 69 in the fitting and shaft. The second end 67B terminates in a flange 70 having a ball fitting 72 thereon. A pair of parallel flanges 74A and 74B are mounted on the body of the fitting 66 between the first and second ends 67A and 67B. A bracket 76 having first and second ends 77A and 77B is mounded by first end 77A to the transmission 20 by means of fastener assembly 78 A right angle link 73 having legs 80A and 80B is pivotally mounted at its center 81 to the second end of the bracket 76. The end of leg 80A terminates in a roller assembly 82 mounted between the two flanges 74A and 74B. The end of leg 80B terminates in a ball fitting 75. The second end 64B of the cable 62, supported by structure 79, terminates in a quick disconnect fitting 83 that releasably engages the ball fitting 75. Thus as the cable 62 translates backwards and forwards, the link 73 rotates clockwise or counter clockwise about its center 81, and the fitting 66 and shaft 28 translates backwards or forwards.

A position sensor 90 is coupled to the sidewall 54 of the housing 39 having an output shaft 92. A lever 94 is rigidly coupled by its first end 95A to the shaft 92. A link 96 is pivotally coupled by its first end 97A to the second end 95B of the lever 94 and by its second end 97B to the first end 58A of lever 56. Thus when lever 56 rotates, the position sensor 90 can measure its angular position, which in turn, measures the position of the shaft 28 on the transmission 20.

Drive assembly 47B also includes an electric motor 100 having an anti-back lash gear reduction unit 101 coupled to an output shaft 102 that extends out of a side wall 54 of the housing 39. A lever 106 having first and second ends, 108A and 108B, respectively, and a middle hole 108C is mounted to the shaft 102 by its middle hole 108C. The second end 108B includes a ball fitting 110. A cable 112 includes a first end 113A incorporating a quick disconnect fitting 116 adapted to mate with ball fitting 110. Thus the ball fitting 110 is in releasable engagement with the quick disconnect fitting 116. The second end 113B of the cable 112, supported by structure 79 terminates in a quick release fitting 118 which is in releasable engagement with the ball fitting 72 on the flange 70. Therefore, movement of the cable 112 causes the shaft 28 to rotate.

A position sensor 120 is coupled to the sidewall 54 of the housing 39 and having an output shaft 122. A lever 124 is rigidly coupled by its first end 125A to the shaft 122. A link 127 is pivotally coupled by its first end 128A to the second end 128B of the lever 124 and by its second end 128B to the first end 108A of lever 106. Thus when lever 106 rotates, the position sensor 120 can measure its angular position, which in turn, measures the rotational position of the shaft 28 on the transmission 20.

Referring to FIG. 10, the shifting controller 38 further includes a control circuit, indicated by numeral 140, which includes a digital control device 142 that receives up shift signals from switches 34A and 34B and downshift signals 32A and 32B, a signal from a clutch position switch 144 coupled to the clutch pedal 17 (See FIG. 1), and a neutral safety switch 147, which can be located on dashboard 10 of the automobile. A suitable digital control device 142 is Part No.; MC33993DWB manufactured by Freescale Semiconductor, Austin, Tex. The output from the digital control device 142 is provided to a microprocessor 150. A suitable microprocessor is Part No.: PIC18F67722-E/PT manufactured by Microchip Technology, Chandler, Ariz.

Also included is an analog control device 152 that receives input from the electric motor position sensors 90 and 120. A suitable analog control device is Part No.: MCP6002-E/SN manufactured by Microchip Technology, Chandler, Ariz. There are outputs on the Digital controller and the Analog controller which can be used to send gear display information to a gear indicator 14 which could be located on the dash 10 or on the steering wheel 19A (see FIG. 4). The output from the analog control device is also coupled to the microprocessor 150. A speed sensor 155, which receives signals from the engine management system 22, can be provided that is coupled to the microprocessor 150. A suitable speed sensor input device is Part No.: CS1124YD8 also manufactured by Microchip Technology, Chandler, Ariz. Also coupled to the microprocessor 150 is a serial communication port 149 to allow programming by means of a personal computer 141. The microprocessor 150 also controls two motor drivers 160A and 160B which are coupled to motors 48 and 100. The motor drivers supply current to the motors to drive them either clockwise or counter clockwise, so as to cause the motors to move the shift mechanism in the proper sequence to do an up shift or downshift.

In the above system the following items are optional:
1. Gear selector display 14.
2. Neutral Safety Switch 147—When this option is enabled, a shift from forward gears into neutral will not be permitted unless this switch is activated. That is going from $1^{st}$ into neutral would only occur when the neutral safety switch is activated.
3. Clutch Switch 144—When this option is enabled, the driver will not be able to shift out of neutral and into a forward gear without this switch being activated. The clutch switch is typically mounted so that it is activated by depressing the clutch pedal 17.
4. Speed Sensor 114—When the RPM Safety option is enabled, the shifter unit will not downshift until a certain speed/rpm limit is met. The purpose of this feature is to limit over-revving when downshifting.

Figure 11:
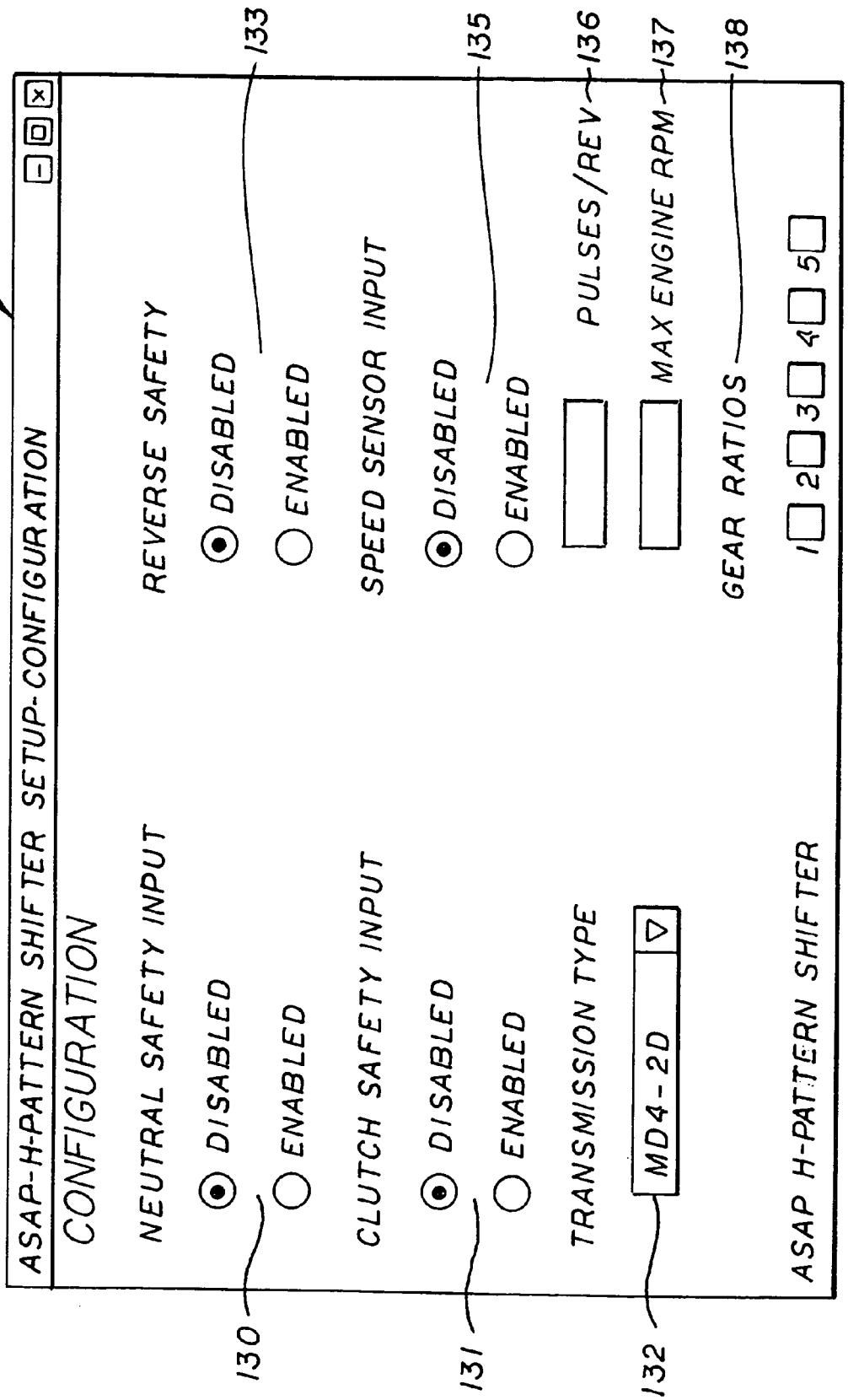
FIG. 11 is a typical computer screen that is used for programming the transmission shifting system.

FIG. 11 illustrates a computer screen presentation 129 that is used to activate the optional devices and initially setup the transmission type. As can be seen, the neutral safety switch 147 is covered by input 130, and the clutch switch 144 by input 131. There is a drop down box 132 to select the transmission type, which determines the throws at the transmission and the location of the gears. The reverse safety option is covered by input 133. Speed sensor 114 is covered by input 135, with the RPM limit settable by, text box 136, Max engine RPM settable by 137, and transmission gear ratios settable by 138. Thus control is easily accomplished by use of the personal computer 141 using the computer screen 129.

Presented in FIGS. 12-17 are flowcharts of the computer program contained in the microprocessor 150

Figure 12A:
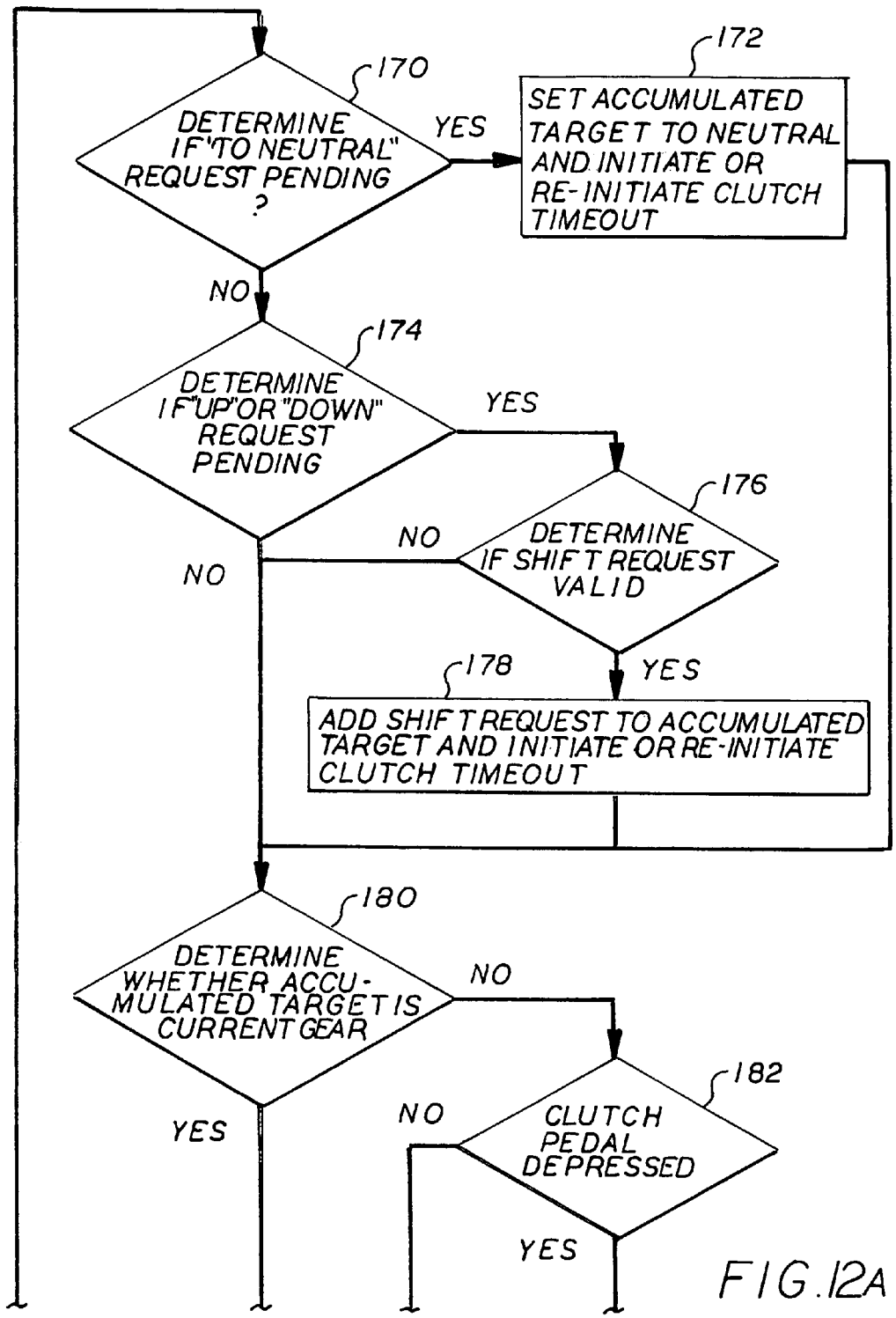
FIGS. 12A and 12B are an overview flow chart of the computer program used to control shifting of the transmission.
Figure 12B:
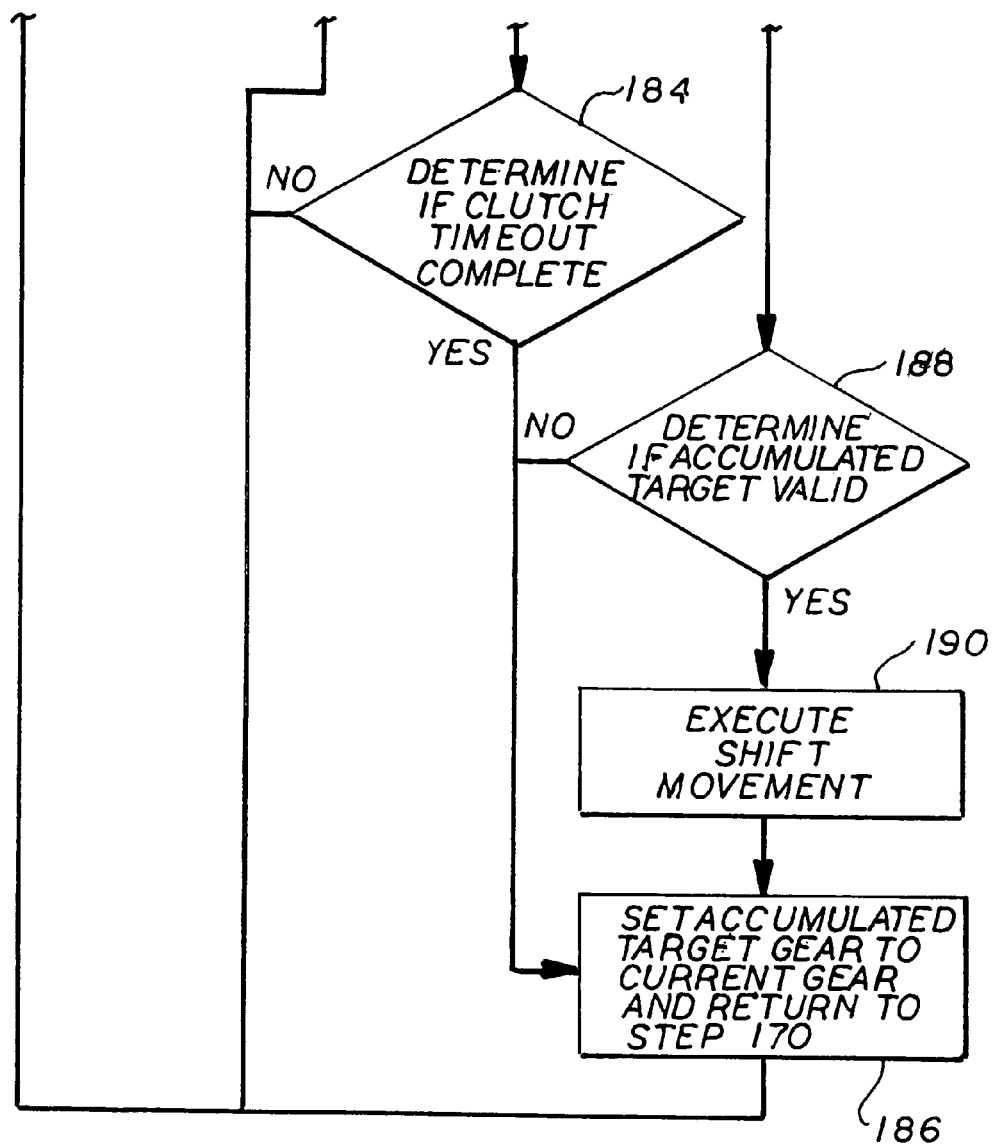

FIGS. 12A and 12B present the main flowchart for the computer and include the following steps:

Step 170—Determine If "To Neutral" Request Pending?—The firmware checks to see if a To Neutral command was given. A to neutral command is used to set the transmission into neutral position. If a to neutral request Is pending then to Step 172; if not pending, then to Step 174.

Step 172—Set Accumulated Target To Neutral and Initiate Or Re-initiate Clutch Timeout. At this point the clutch timeout is reset and the requested gear is set to Neutral. Then to Step 180.

Step 174—Determine If "Up" Or "Down" Request Pending. A check is made to see if the user issued an up or down shift request. If yes, then to Step 176; if no to Step 180.

Step 176—Determine If Shift Request Valid. The firmware then checks to make sure that the shift request that the user has issued is a valid request. See flowchart in FIGS. 13A and 13B for details of process. If no, to step 180; if yes, to Step 178.

Step 178—Add Shift Request To Accumulated Target and Initiate Or Re-initiate Clutch Timeout—The requested valid shift is now added to the accumulated target gear.

Step 180—Determine Whether Accumulated Target Is Current Gear. A check is made to see if the current target gear is the gear that the transmission is now in. If the transmission is now in the requested gear, no further action is needed and the loop continues until another shift request is given; go back to step 170. If the transmission is not in the requested gear then there is still work to be done to get the transmission into that requested gear; go to step 182.

Step 182—Clutch Pedal Depressed. A check is made to make sure the clutch pedal is depressed. If the clutch is not depressed then the shifter unit needs to give the driver a chance to press that clutch pedal before attempting the shift, or allow the driver more time to accumulate shifts. Thus if no, to step 184; if yes, to Step 188.

Step 184—Determined If Clutch Timeout Complete.—The firmware checks to see if the driver has waited too long to press in the clutch and therefore it need to reset his request. This timeout value is configurable: some users may want it set at two seconds, some may want it longer. If the time allocated for the driver to press the clutch has expired then to Step 186; if no to Step 170.

Step 186—Set Accumulated Target Gear To Current Gear and return to step 170. Since the driver has waited too long to press the clutch pedal, we need to reset the gear to the current gear so that if at a later time the driver presses the clutch, that the shifter unit will not attempt to shift the transmission. Think of a situation where the driver is going into a curve. The driver wants to downshift, so he or she presses the downshift paddle. However, if the driver does not depress the clutch, and then decides not to downshift; there could be a problem. For example, two minutes later the driver may wish to slow down a bit so he or she puts in the clutch, and all of a sudden the transmission downshifts. This is definitely something to be avoided. After the accumulated gear is set to the current gear the loop continues at step 170.

Figure 16:
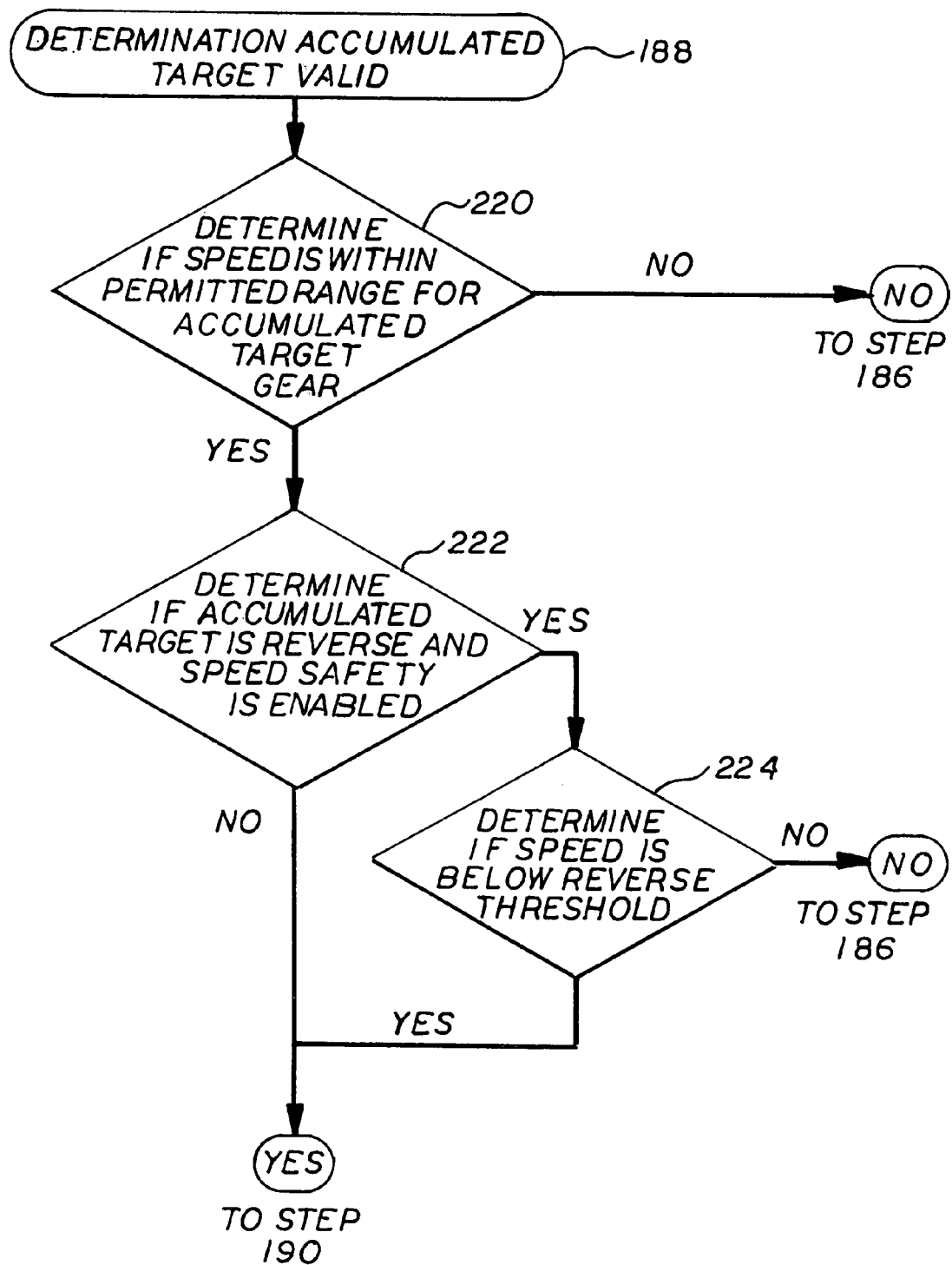
FIG. 16 is a flow chart of the computer program for determining if the accumulated target gear is valid.

Step 188—Determine If Accumulated Target Valid—Here the firmware runs some checks prior to moving the shift linkage to make sure all criteria have been meet; which is described in FIG. 16. If no, to step 186; if yes, to step 190.

Step 190—Execute shift movement. This step is covered in FIG. 17.

Figure 13A:
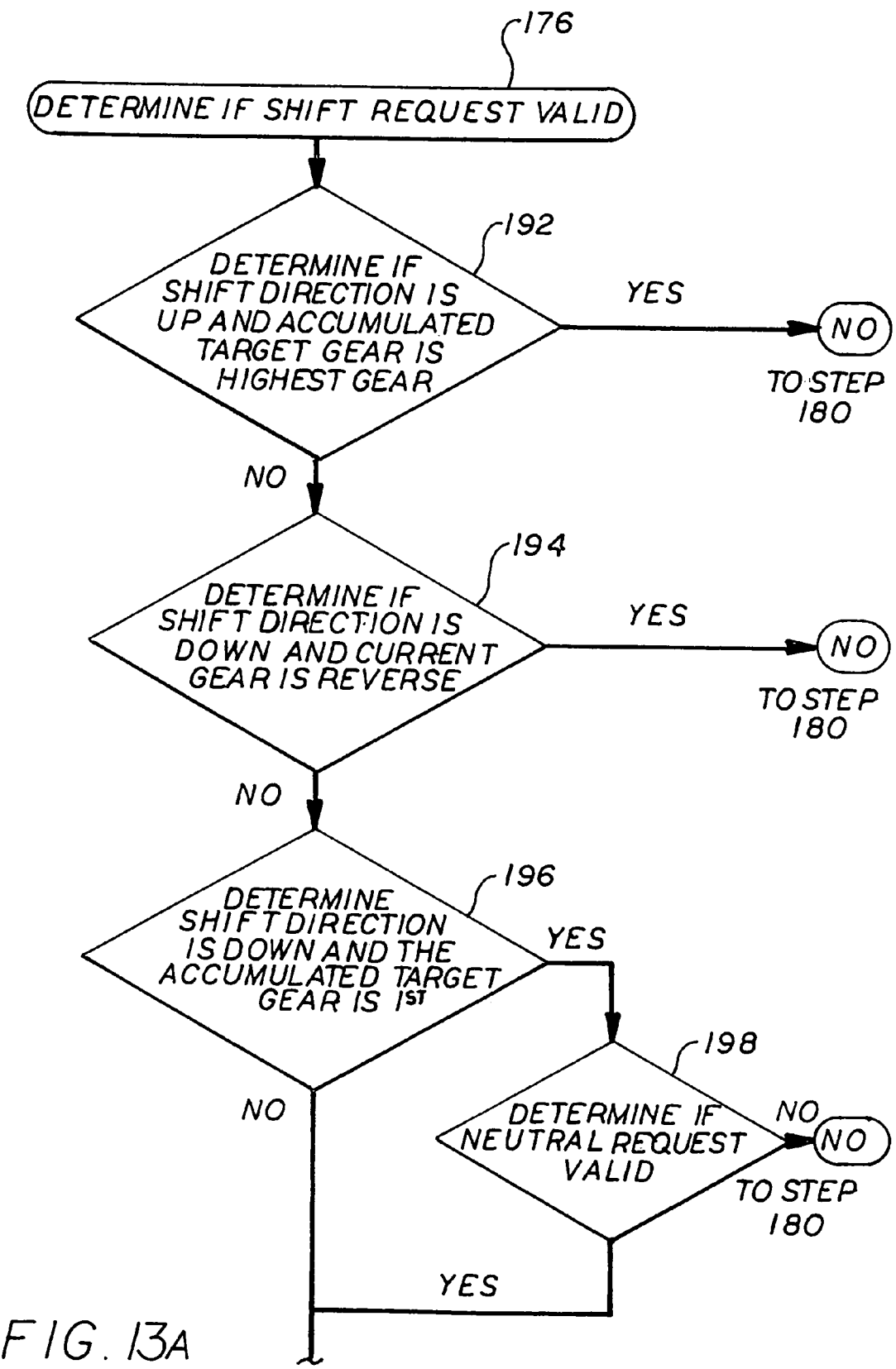
FIGS. 13A and 13B are a flow chart of a computer program for determining if a shift request is valid.
Figure 13B:
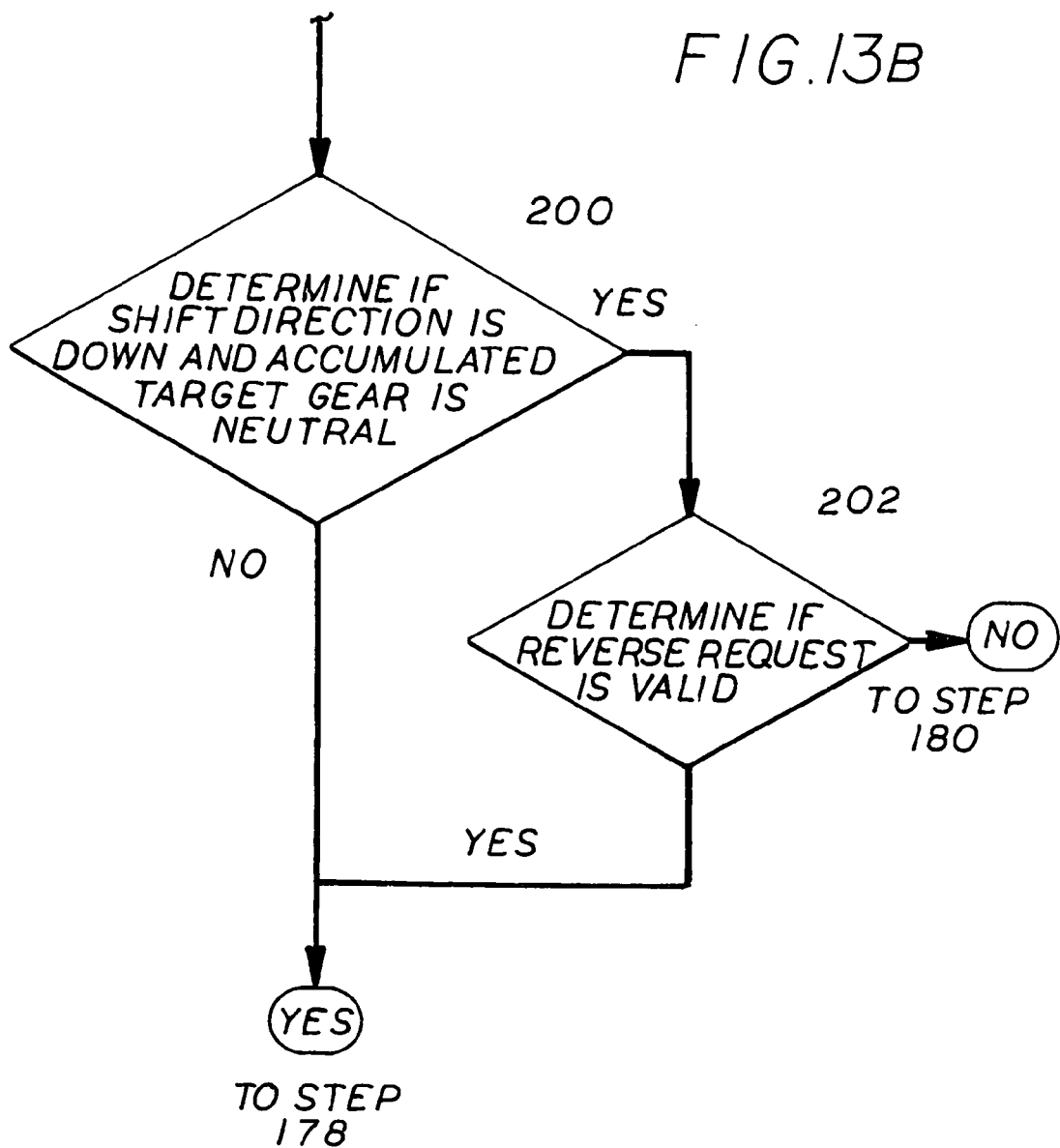

Referring to FIGS. 13A and 13B, the Step 176 Determine If Shift Request Valid (referred to in FIGS. 12A and 12B) checks whether an upshift or downshift request is valid and includes the following steps:

Step 192—Determine If Shift Direction Is Up, And Accumulated Target Gear Is Highest Gear. Here a check is made to make sure that the user is not trying to shift past the highest gear that has been set for the shifter based upon the transmissions highest gear. For example, the driver has a 4 speed transmission and currently the accumulated gear is $4^{th}$, and a shift request has been made to go to a fifth, non existent gear. The shift is ruled invalid and a "no" is returned by step 176. If the accumulated target gear is not the highest gear and the shift direction is up, then the shift so far can be allowed and thus to Step 194.

Step 194—Determine If Shift Direction Is Down, And Current Gear Is Reverse. The driver can not downshift past reverse, so the shift is invalid, and a "no" is returned by step 176. If the current gear is not reverse than the down shift is so far valid and thus to Step 196.

Step 196—Determine Shift Direction Is Down, And The Accumulated Target Gear Is $1^{st}$. If not a downshift from $1^{st}$ into Neutral, go to Step 200. If it is a downshift from $1^{st}$ into Neutral, a check must be made to verify that a downshift into neutral is allowed; go to Step 198.

Step 198—Determine If Neutral Request Valid. Here a check is made to make sure that the downshift request into neutral gear is valid and will be allowed. The Process involved in Step 198 is discussed in the FIG. 14 Flowchart. After the check, if the request is not valid than a "no" is returned by step 176. If the request is valid, then to Step 200.

Step 200—Determine If Shift Direction Is Down And Accumulated Target Gear Is Neutral. If it is not a downshift or the current accumulated gear is not Neutral then step 176 returns a "yes". If it is a downshift and the current accumulated gear is neutral than a check must be made to verify that a shift into reverse is allowed; go to Step 202.

Step 202—Determine If Reverse Request Is Valid. Here a series of checks are made to make sure that a shift into Reverse will be allowed and process is presented in FIG. 15. If the answer is no, step 176 returns a "no". If a yes is returned after the check then the shift is valid and a "yes" is returned by step 176.

Figure 14:
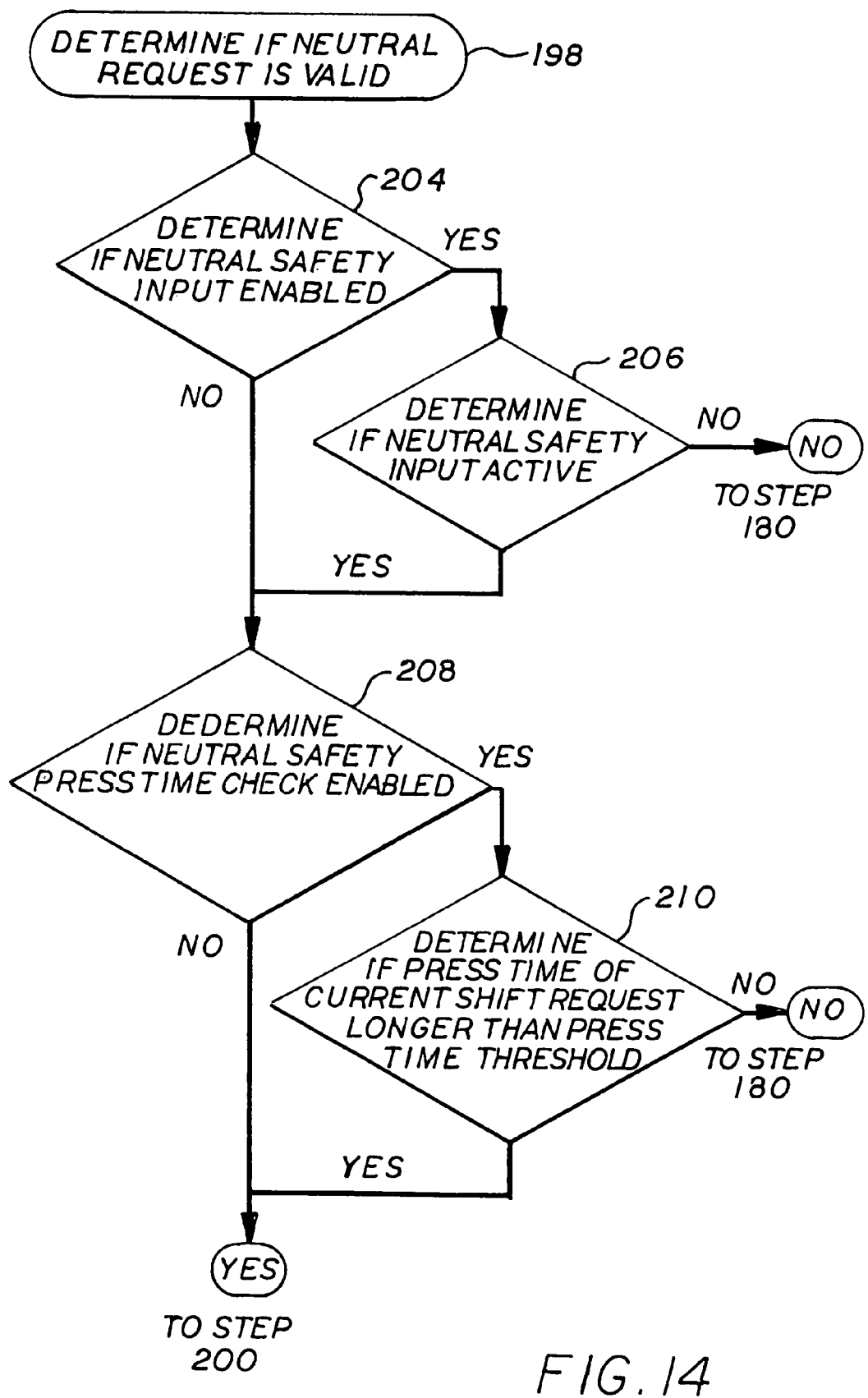
FIG. 14 is a flow chart of the computer program for determining if a neutral gear request if valid.

Referring To FIG. 14, the Step 198 Determine If Neutral Request Is Valid (referred to in FIGS. 13A and 13B) checks whether a request to shift into neutral gear through a downshift signal is valid and includes the following steps:

Step 204—Determine If Neutral Safety Input Enabled. The Neutral Safety input is a user configurable option that checks to make sure a switch is pressed prior to allowing a downshift into neutral. If this option has been disabled by the driver, then there is no need to check the Neutral Safety switch. Thus, the program goes to Step 208. If this option is enabled than to Step 206.

Step 206—Determine If Neutral Safety Input Active. This is to see if the Neutral Safety button is being pressed which will, so far, allow the shift into Neutral. If the button is being pressed then to step 208. If the button is not being pressed then the shift into Neutral is considered not intentional and step 198 returns a "no".

Step 208—Determine If Neutral Safety Press Time Check Enabled. This is a driver configurable option that will not allow a downshift into neutral without the downshift button being pressed for a certain configurable amount of time. If this option is not enabled, then no further checks need to be made and step 198 returns a "yes". If this option is enabled, the driver needs to make sure that he or she has held down the button for the configurable amount of time before we allow the shift into Neutral to be valid; go to step 210.

Step 210—Determine If Press Time Of Current Shift Request Longer Than Press Time Threshold. Here the controller makes sure that the button or paddle is held down for a long enough period such that the criteria that tells the shifter unit that indeed the driver wishes to shift into Neutral has been met. If the time threshold has been met, then the shift into Neutral is valid, and step 198 returns with a "yes". If the user did not hold down the button or paddle long enough for the shifter unit to verify that the driver indeed wishes to go into Neutral then step 198 returns a "no".

Figure 15:
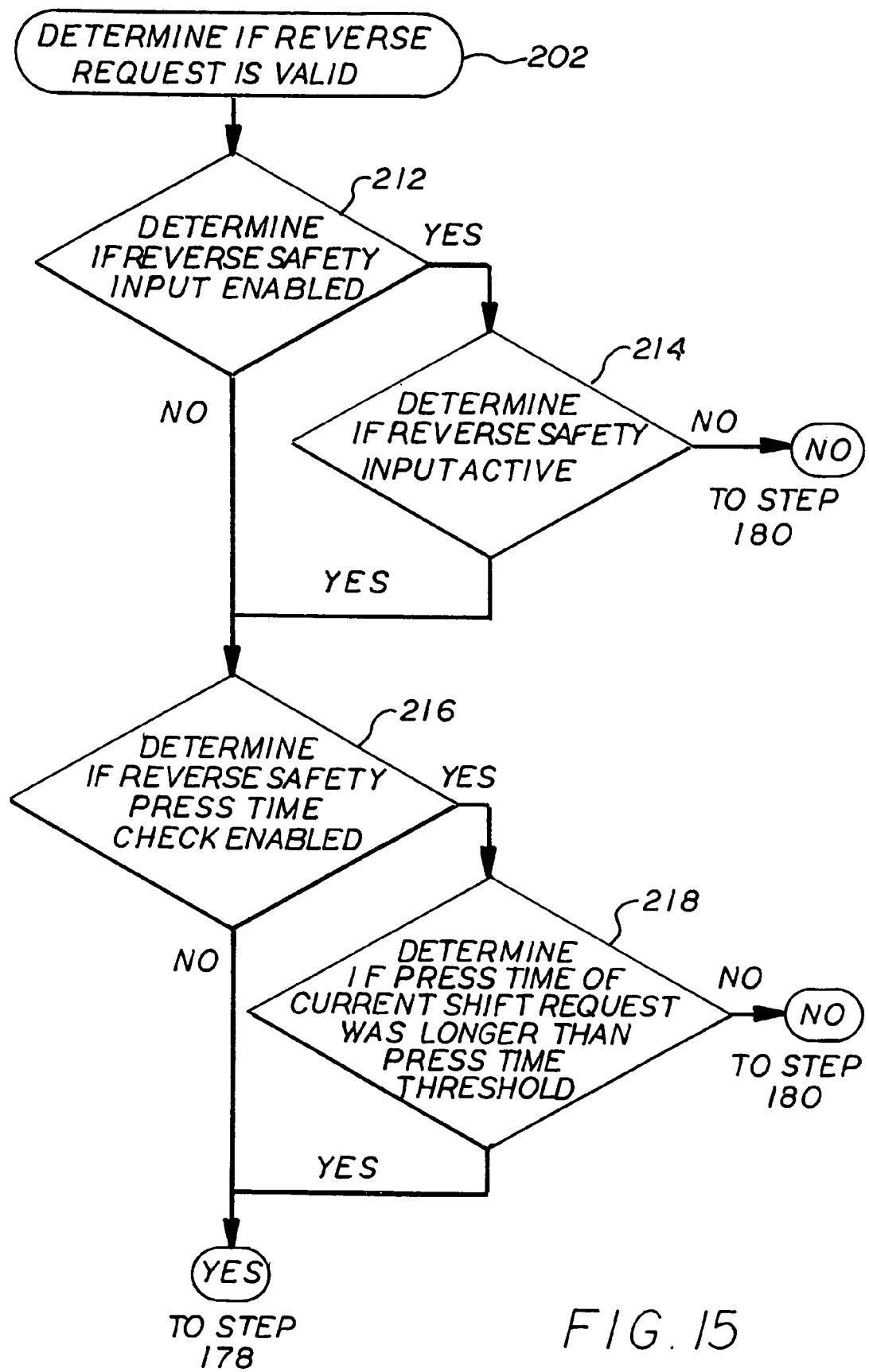
FIG. 15 is a flow chart of the computer program for determining if a reverse gear request if valid.

Referring to FIG. 15, the step 202 Determine If Reverse Request Is Valid (referred to in FIGS. 13A and 13B) checks whether a request to shift into reverse gear is valid and includes the following steps:

Step 212—Determine If Reverse Safety input enabled. This is a check to see if the driver has enabled the optional reverse safety input. If the driver has enabled the safety he is required to push an auxiliary button to activate the reverse safety. This auxiliary button may be a dash-mounted button to be pressed manually, or it may be a switch coupled to the brake pedal. In the latter case, the driver would be required to press the brake pedal instead of pushing a dash-mounted pushbutton for a shift into reverse gear. If this option is used to step 214, if not to step 216.

Step 214—Determine If Reverse Safety Input Active. Since the Driver has enabled the reverse safety input then the program must check to make sure the switch (be it user activated or based of the brake being pressed) is in the active position. If the reverse safety switch is not active then the shift into reverse is not valid and a "no" is returned by step 202; if it has been activated then to step 216.

Step 216—Determine If Reverse Safety Press Time Check Enabled. This is a driver configurable option that will not allow a shift into reverse without the downshift button being pressed for a certain configurable amount of time. If this option is not enabled, step 202 returns a "yes". If this option is enabled then it must be determined that the button has been held down for the configurable amount of time before a shift into reverse becomes valid. Thus to step 218.

Step 218—Determine If Press Time of Current Shift Request Was Longer Than Press Time Threshold. Here it is determined if the driver has held down the button or paddle for a long enough period that the criteria that tells the shifter unit that indeed the driver wishes to shift into reverse has been met. If the time threshold has been met, then the shift into reverse is valid, and a "yes" is returned by step 202. If the driver did not hold down the button or paddle long enough for the shifter unit to verify that the driver indeed wishes to go into Neutral then a "no" is returned by step 202.

Referring to FIG. 16, the step 188 Determination Accumulated Target Valid (referred to in FIGS. 12A and 12B) checks immediately before the execution of a shift movement whether the target gear is valid and includes the following steps:

Step 220—Determine If Speed Is Within Permitted Range For Accumulated Target Gear. This is a check to verify that the speed of the vehicle is within range for the shift to be safely made. A downshift from $5^{th}$ to $1^{st}$ at 120 mph would usually destroy the engine or the transmission. This can be prevented using these configurable speed rules. These values will be adjustable and are in no way permanently set to a specific speed or threshold. If the vehicle is going too fast for the shift to safely be made then a "no" is returned by step 188. If the speed is within the configurable speed limits then one final check is made to verify that the shift is valid; go to step 222.

Step 222—Determine If Accumulated Target Is Reverse And Speed Safety Is Enabled. This is a further safety measure to verify that the vehicle is not currently rolling faster than is safe to engage the Reverse gear. This option can be disabled. If this option is disabled then no further checks need to be made and a "yes" is returned by step 188. If this safety is enabled then we must verify that the speed is within the limits to permit the shift into Reverse; go to step 224.

Step 224 Determine If Speed Is Below Reverse Threshold. Here the program checks to make sure that the vehicle is not moving faster than is safe to engage reverse gear into. If the speed is below the configurable threshold then a "yes" is returned by step 188. If the speed is over the threshold then a "no" is returned by step 188.

Figure 17:
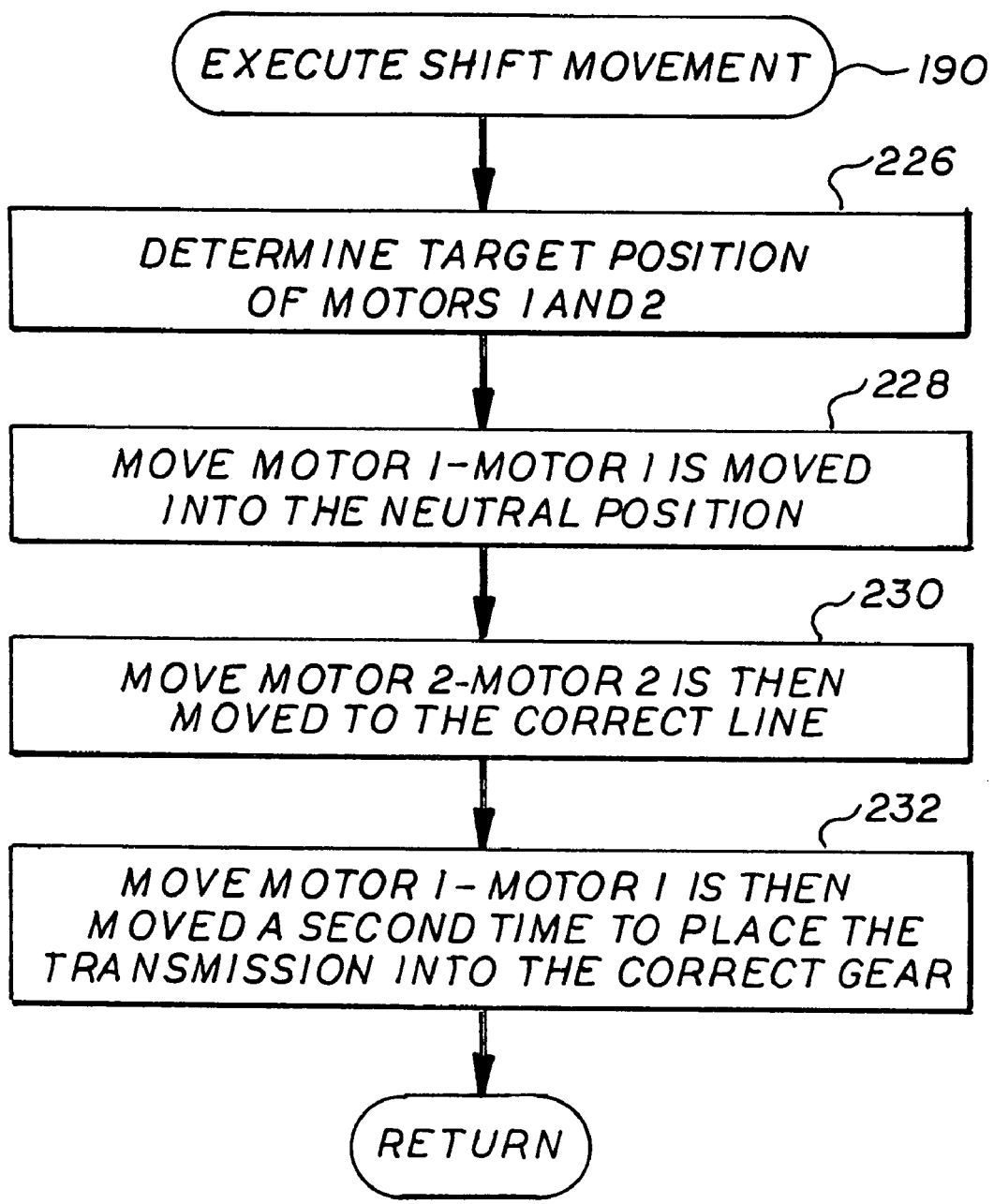
FIG. 17 is a flow chart of the computer program for executing shift movements.

Referring to FIG. 17, the Step 190 Execute Shift Movement (referred to in FIGS. 12A and 12B) includes the following steps:

Step 226 Determine Target Positions Of Motors 1 and 2—Once the program knows the final accumulated gear, the program instructs the two motors how they must relocate to get the transmission in the correct gear. The movement that these two motors make will vary between different transmission models. The transmission model will be selected using the software supplied with the unit (132 of FIG. 11). When the transmission model is selected, the gear values will be saved to the shifter unit. These gear values will be used by the firmware to place the two motors in the correct locations. Motor 1 does the in/neutral/out motions, while motor 2 does the multiple lines of rotation. A 3 speed transmission will have 2 or 3 lines of rotation, a 4 to 5 speed will have 3 or 4 lines of rotation, and 6 speeds will have 4 or 5 lines of rotation.

Step 228—Move Motor 1—Motor 1 is moved into the neutral position.

Step 230—Move Motor 2—Motor 2 is then moved to the correct line. It is possible that Motor 2 may not move during a shift, such would be the case when it is a shift from $1^{st}$ to $2^{nd}$ which would be on the same line of movement.

Step 232—Move Motor 1—Motor 1 is then moved a second time to place the transmission into the correct gear.

Figure 18:
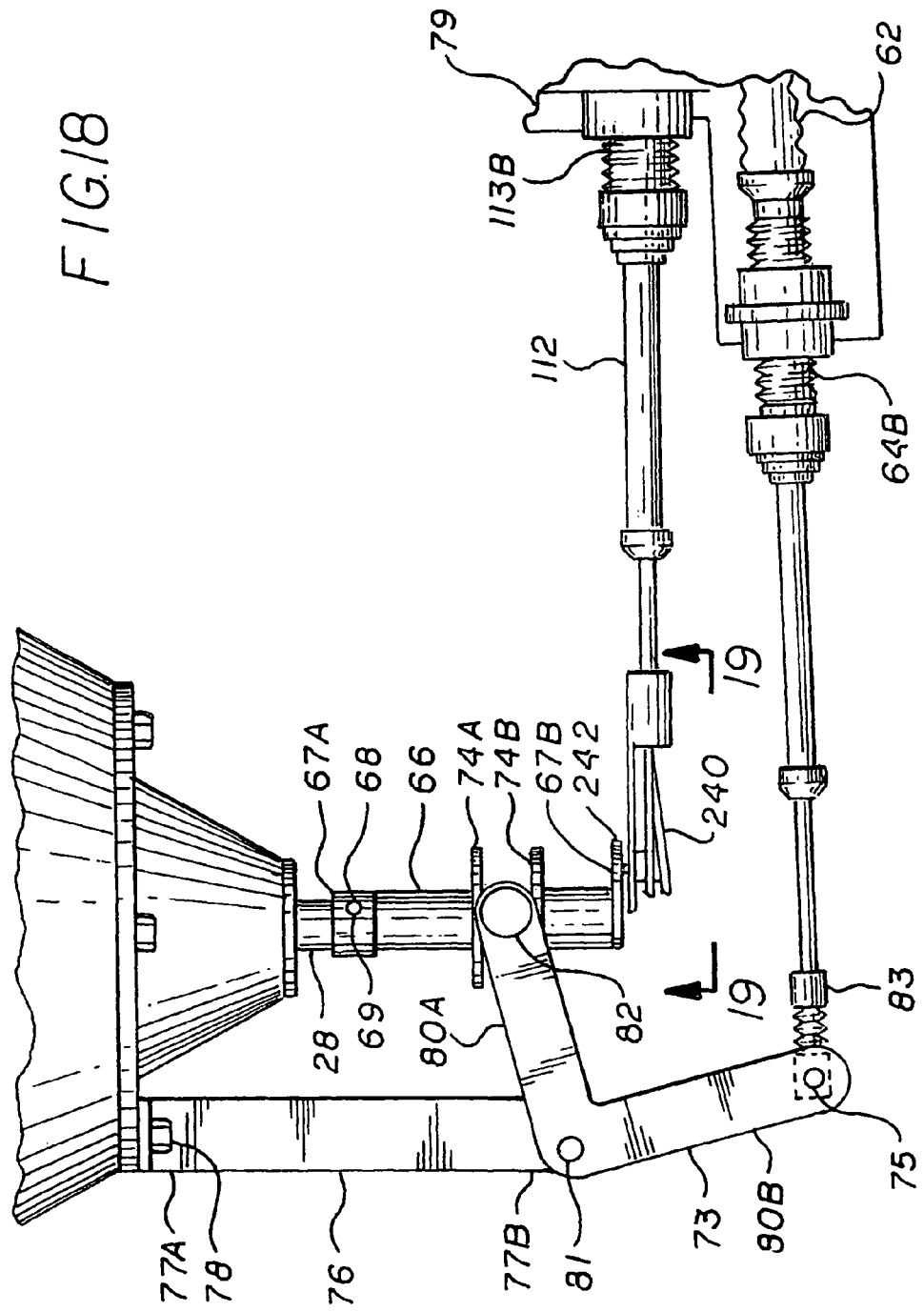
FIG. 18 is a view similar to FIG. 8 illustrating a preferred pre-biasing device for rotating the transmission operating shaft.
Figure 19:
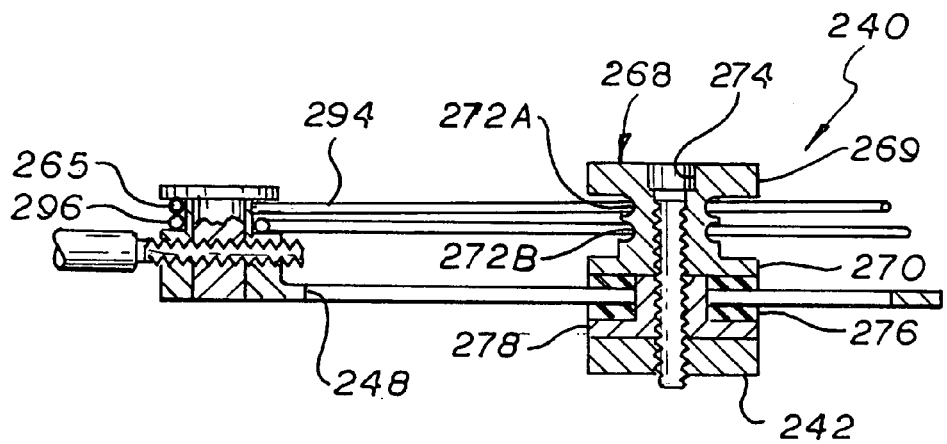
FIG. 19 is a side view along the arrow 19 of the pre-biasing device shown in FIG. 18.
Figure 20:
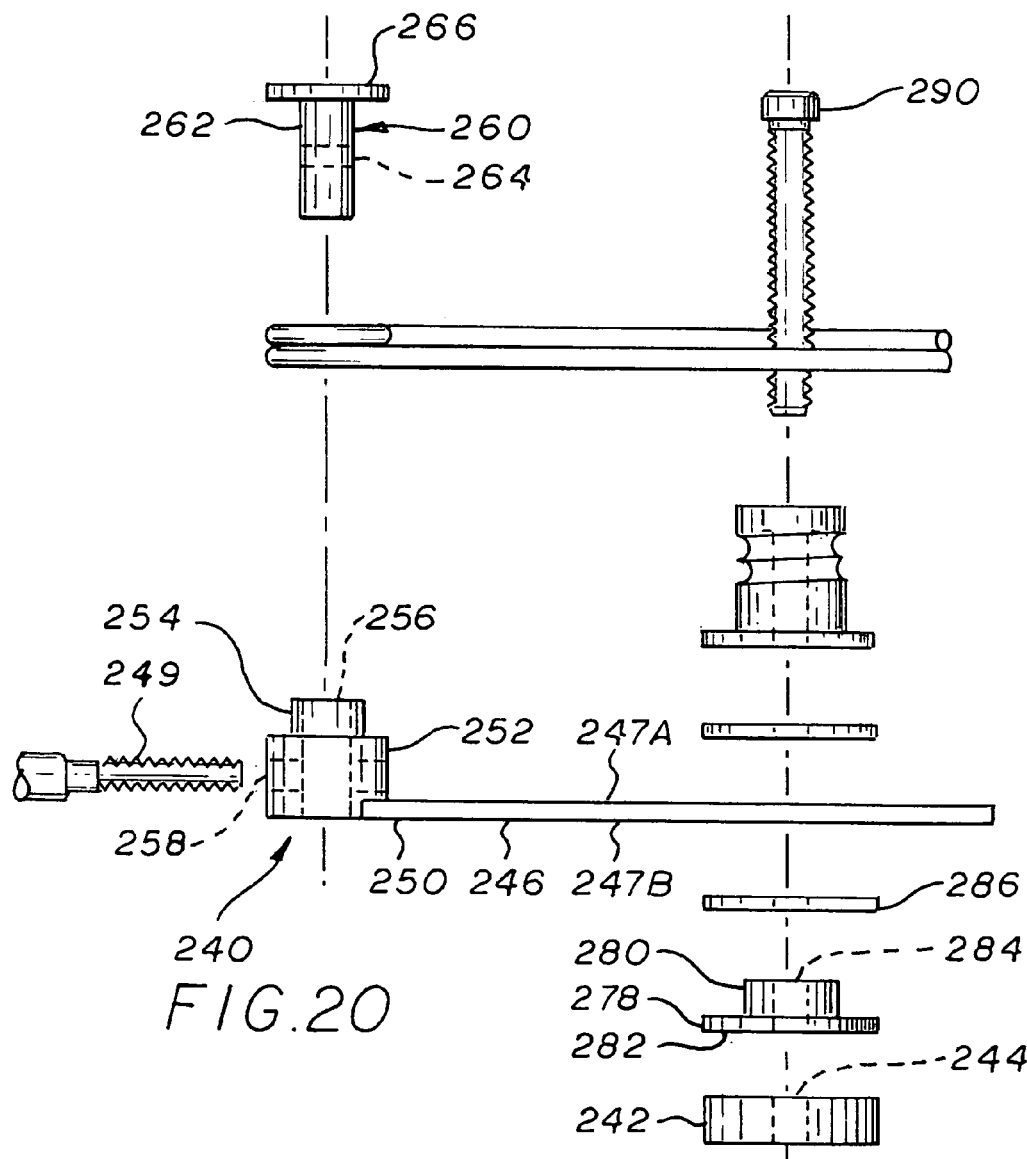
FIG. 20 is an exploded view of the pre-biasing device shown in FIG. 18.

Referring to FIGS. 18, 19 20 and in the blown up position FIG. 21, shifting speed can be greatly increased by pre-biasing rotation of the shaft 66. This is accomplished by coupling the shaft 112 to a biasing device 240 mounted on end 113B thereof. The flange 242 connected to the shaft 66 (replaces flange 70 in FIG. 8) includes a threaded bolt hole 244. The device 240 includes a flat member 246 first and second sides 247A and 247B and further having a slot 248 therein.

At a first end 250 of the member 246 is a circular shaped protrusion 252 having a reduced diameter portion 254 with a first hole 256 extending there through. A thread hole 258 extends the protrusion 252 parallel to the flat member 246. A T shaped member 260 having a cylindrical body 262 with a hole 264 there through and a end cap 266. The member 260 is mounted on the protrusion 252 such that the hole 264 therein is aligned with the hole 258, when the end cap 266 contacts the protrusion 252. The thread end 249 of the shaft 112 (which in FIG. 8 engaged the ball fitting 72, now removed is engaged with) threadably engage the threaded hole 258 while extending through hole 264 in the T shaped member 260, locking it to the protrusion 252 and forming a groove 265.

the device 240 is slidably mounted to arm 242 by means of a spring guide slide assembly 268. The assembly 268 has a first portion mounted on side 247A of flat member 246 comprising a assembly 269 that includes a circular shaped spring guide 270 having a pair of external grooves 272A and 272B and a counter sunk bolt hole 274. Beneath the guide 270 and in contact with side 247A is a plastic low friction washer 276. On the side 247B is a base cap 278 having a circular member 280 with a flange 282 and center hole 284. A second plastic low friction washer 286 is mounted between the base cap flange 282 and the side 247B. A bolt 290 extends through the guide 270 washer 276 slot 248, washer 286 and base cap 278 and is threadably engages the hole; 274 on the arm 242 secured. Thus the device is slidably mounted to flange 242.

A wire spring 294 includes a double loop center portion 296 wound around the portion 254 of the protrusion 252 and has two arms 298A and 298B which cross each other between the protrusion 252 and assembly 268 and contact grooves 272A and 272B, respectively and again cross each other near there ends 300A and 300B. Thus the spring 294 biases the assembly 268 to the position shown in FIG. 19.

When the device 240 is in the position shown in FIG. 19 and 21 the 1transmission system can be shifted to any gear as illustrated in FIG. 22. When up shifting from second to third gear or from fourth gear to fifth in FIG. 23, the motor 100 is actuated prior to the actual shift such that the device 240 is in the position shown in FIG. 24 with the spring 294 biasing the arm 242 cause the shaft 66 to rotate to the left. When the transmission has shifted to third or fifth from second or fourth gear as shown in FIG. 25, the device 240 has returned to the position shown in FIG. 26 with the arm 242 but not biased. When the transmission shifts is to be down shifted from third gear to second gear or from fifth to fourth gear as shown in FIG. 27, the motor 100 pre loads the device 240 to rotate the arm 242 and thus the shaft 66 to the right as shown in FIG. 28. When the shifting is completed to second or fourth gear as shown in FIG. 29, the device 240 is now returned to the position shown in FIG. 30 with the arm 240 and shaft 66 rotated to the right.

Figure 31:
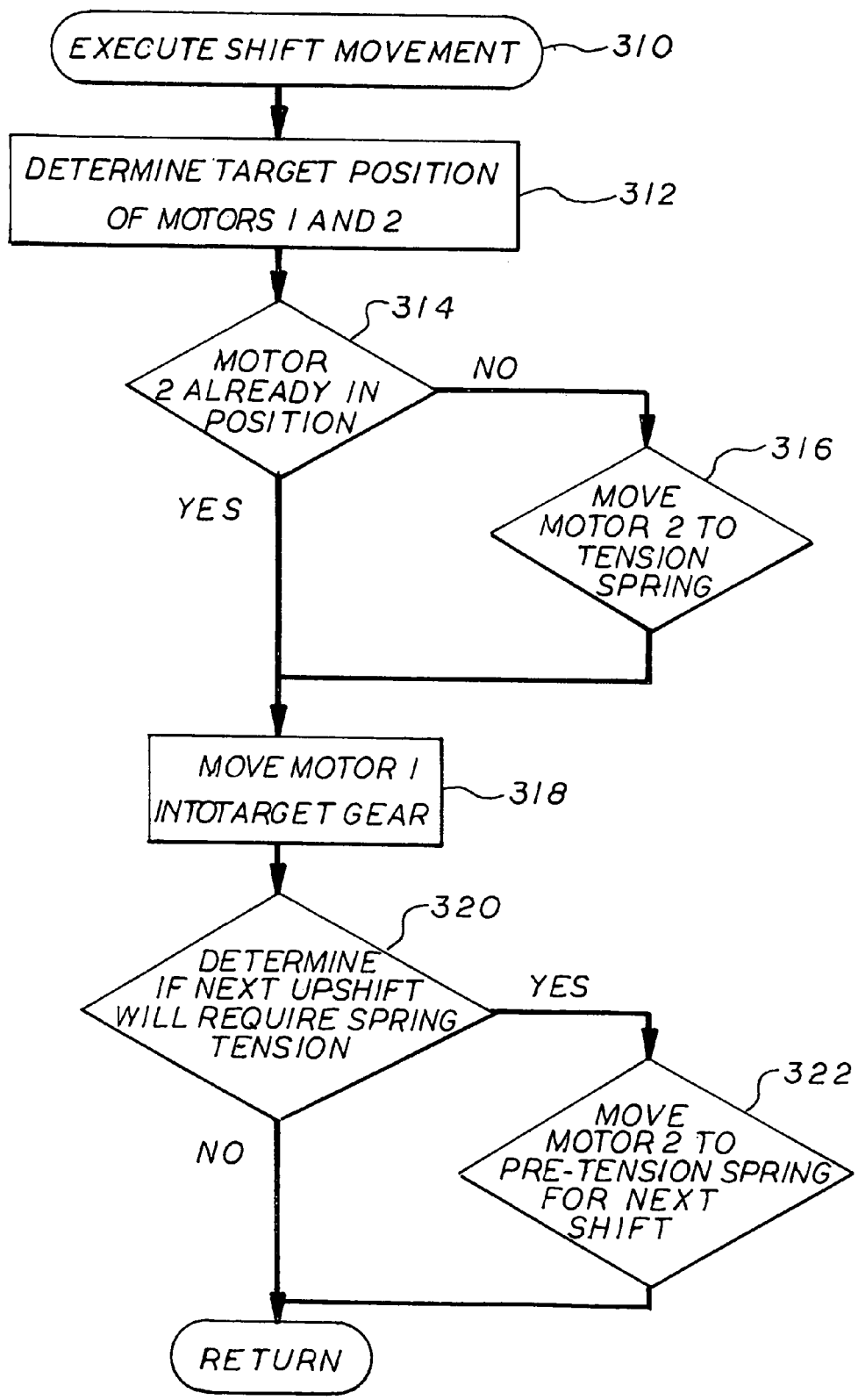
FIG. 31 presents a flow chart for a computer program for executing shift movements using the device shown in FIGS. 18, 19 and 20.

Referring the flow chart in FIG. 31 which take the place of the flow chart in FIG. 17 when the biasing means is utilized.

Step 310 Execute Shift Movement (referred to in FIGS. 12A and 12B) includes the following steps:

Step 312 Determine Target Positions Of Motors 1 and 2—Once the program knows the final accumulated gear, the program instructs the two motors how they must relocate to get the transmission in the correct gear. The movement that these two motors make will vary between different transmission models. The transmission model will be selected using the software supplied with the unit (132 of FIG. 11). When the transmission model is selected, the gear values will be saved to the shifter unit. These gear values will be used by the firmware to place the two motors in the correct locations. Motor 1 does the in/out motions, while motor 2 does the multiple lines of rotation utilizing the biasing means. A 3 speed transmission will have 2 or 3 lines of rotation, a 4 to 5 speed will have 3 or 4 lines of rotation, and 6 speeds will have 4 or 5 lines of rotation.

Step 314—Motor 2 Already In Position—The location of Motor 2 is checked to see if it is already in the correct rotational position for the requested gear. If yes to Step 318, if no then to Step 316. It is possible that Motor 2 may not need to move during a shift, such would be the case with a standard shift from $1^{st}$ to $2^{nd}$ which would be on the same line of movement.

Step 316—Move Motor 2 To Tension Spring—Motor 2 is moved to the correct line for the requested gear and the biasing means will tension the shaft 66.

Step 318—Move Motor 1 Into Target Gear—Motor 1 is then moved to place the transmission into the correct gear. When Motor 1 reaches the neutral position of the transmission the biasing devices force will un-tension, rotating the shaft 66 to the correct location, and Motor 1 will continue into the requested gear.

Step 320—Determine If Next Upshift Will Require Spring Tension—A check is made to see if the next upshift will require the biasing device to apply tension to the shaft 66. If yes, then Motor 2 needs to move again to prepare the transmission for an up shift (such as a second to third shift), see Step 322.

Step 322—Move Motor 2 To Pre-Tension Spring For Next Shift—Motor 2 is moved to apply a biasing force to the shaft 66 in anticipation of an upshift that will require its rotation.

Thus it can be seen that by using electric motors with anti-backlash gears, steering wheel mounted shifting switches, the transmission shifting program in the microprocessor, and the various sensors and switches, shifting can be accomplished without the driver removing his or her hands from the steering wheel. Additionally, the safety interlocks insure that inadvertent shifting into the wrong gear position or over-revving of the engine can be prevented. Furthermore, it must be noted that, while an automobile transmission is used as an example, other vehicles, such as boats, can make use of this invention.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability primarily to the automobile and boat industries.

The invention claimed is:

1. A transmission shifting system for a vehicle, the vehicle having a transmission having a member that is push and pulled to engage a gear and rotated when the transmission is in neutral for operating the transmission movable in an H pattern, the system comprising:
    a first reversible electric motor having an anti backlash gear assembly; said first motor coupled to the member for moving the member backwards and forwards in and out of gear;
    a second reversible electric motor having an anti backlash gear assembly; said second motor coupled to the member for rotating the member clockwise and counterclockwise said second motor coupled to said member;
    biasing means coupled between said member and said second motor, said biasing means applies a biasing force to the member when the member is in a position wherein it can not rotate when said second motor is rotated; and
    transmission shifter control means for actuating said first and second motors to move the member in the H pattern upon receipt of an actuation signal;
    such that when the transmission is in gear and the member can not rotate, said second motor can be rotated to cause said biasing means to bias the member to rotate and once said first motor has moved the transmission into neutral, said biasing means will automatically rotate the member without said second motor rotating.

2. The transmission shifting system as set forth in claim 1 further comprising;
    the member includes a crank handle with a pin;
    a first shaft having first and second ends, said first end coupled to said second motor and said second end mounting said biasing means, said biasing means coupled to said pin.

3. The transmission system as set forth in claims 2 wherein said biasing means includes:
    said second of said second end of said first shaft including a slot and a lug mounted on said first shaft inboard of said slot;
    said pin of said crank handle movably mounted in said slot;
    a resilient wire spring having a middle portion and first and second leg portions, said middle portion wrapped around said lug and said first and second legs crossing each other between said lug and said pin extending about said pin and re-crossing on the opposite side of the pin, biasing said pin in a first position.

4. The system as set forth in claim 3 including means to prevent the downshifting to a lower gear if the maximum engine speed limit would be exceeded.

5. The system as set forth in claim 4 including means to prevent the shifting into reverse if the vehicle is moving forward.

6. The system as set forth in claim 5 wherein the transmission includes a clutch; the system including
    means to prevent a shift unless the clutch is disengaged.

7. The system as set forth in claim 6 including means to allow a multiple gear down shift with one disengagement of the clutch.

8. The system as set forth in claim 5 wherein the transmission includes a clutch: the system including
    means to prevent a shift unless said clutch is disengaged.

9. The vehicle as set forth in claim 8 including means to allow a multiple gear down shift with one disengagement of said clutch.

10. The system as set forth in claim 1, or 2, or 3, or 4, or 5, or 6, or 7, wherein the vehicle includes a steering wheel, said steering wheel including a gear selection means mounted on said steering wheel for providing the signal to said transmission shifter control means.

11. The system as set forth in claim 10 including means to visually indicate the gear in which the transmission is in.

12. A vehicle comprising:
    an engine;
    a transmission having a member that is push and pulled to engage a gear and rotated when the transmission is in neutral for operating the transmission movable in an H pattern, the system comprising:
    a first reversible electric motor having an anti backlash gear assembly;
    said first motor coupled to the member for moving the member backwards and forwards in and out of gear;
    a second reversible electric motor having an anti backlash gear assembly; said second motor coupled to the member for rotating the member clockwise and counterclockwise said second motor coupled to said member;
    biasing means coupled between said member and said second motor, said biasing means applies a biasing force to the member when the member is in a position wherein it can not rotate when said second motor is rotated; and
    transmission shifter control means for actuating said first and second motors to move the member in the H pattern upon receipt of an actuation signal;
    such that when the transmission is in gear and the member can not rotate, said second motor can be rotated to cause said biasing means to bias the member to rotate and once said first motor has moved the transmission into neutral, said biasing means will automatically rotate the member without said second motor rotating.

13. The vehicle as set forth in claim 12 wherein further comprising;
    the member includes a crank handle with a pin;
    a first shaft having first and second ends, said first end coupled to said second motor and said second end mounting said biasing means, said biasing means coupled to said pin.

14. The vehicle as set forth in claims 13 wherein said biasing means includes:
    said second of said second end of said first shaft including a slot and a lug mounted on said first shaft inboard of said slot;
    said pin of said crank handle movably mounted in said slot;
    a resilient wire spring having a middle portion and first and second leg portions, said middle portion wrapped around said lug and said first and second legs crossing each other between said lug and said pin extending about said pin and re-crossing on the opposite side of the pin, biasing said pin in a first position.

15. The vehicle as set forth in claim 14 including means to prevent the downshifting to a lower gear if the maximum engine speed limit would be exceeded.

16. The vehicle as set forth in claim 15 including means to prevent the shifting into reverse if the vehicle is moving forward.

17. The vehicle as set forth in claim 12, or 13, or 14, or 15, or 16, or 8 or 9 wherein the vehicle includes a steering wheel, said steering wheel including a gear selection means mounted on said steering wheel for providing the signal to said transmission shifter control means.

18. The vehicle as set forth in claim 17 including means to visually indicate the gear in which the transmission is in.

* * * * *